US005802513A

United States Patent [19]

Bowie, III

[11] Patent Number: 5,802,513

[45] Date of Patent: Sep. 1, 1998

[54] METHOD AND SYSTEM FOR DISTANCE DETERMINATION AND USE OF THE DISTANCE DETERMINATION

[75] Inventor: Hugh Bowie, III, Lawrenceville, Ga.

[73] Assignee: BellSouth Corporation, Atlanta, Ga.

[21] Appl. No.: 593,122

[22] Filed: Feb. 1, 1996

[51] Int. Cl.[6] .......... G06F 17/30

[52] U.S. Cl. .......... 707/3; 707/104; 379/113; 379/114; 379/127; 379/144

[58] Field of Search .......... 395/603, 615; 379/113, 114, 127, 144; 364/443, 420, 461, 449.4; 342/357, 457

[56] References Cited

U.S. PATENT DOCUMENTS

| | | | |
|---|---|---|---|
| 3,870,866 | 3/1975 | Halpern | 379/144 |
| 4,525,601 | 6/1985 | Barnich et al. | 379/112 |
| 4,538,030 | 8/1985 | Fossett et al. | 379/114 |
| 4,757,267 | 7/1988 | Riskin | 379/113 |
| 5,559,707 | 9/1996 | Delorme et al. | 364/443 |
| 5,588,048 | 12/1996 | Neville | 379/127 |

*Primary Examiner*—Paul R. Lintz
*Attorney, Agent, or Firm*—Jones & Askew

[57] ABSTRACT

A method and system for determining the geographical distance between a first object and a second object based on the use of a vertical-horizontal coordinate system. First identification information for the first object is provided, and a first set of vertical-horizontal coordinates corresponding to the first object is determined. Similarly, second identification information for the second object is provided, and a second set of vertical-horizontal coordinates corresponding to the second object is determined. The first and second set of vertical-horizontal coordinates are used to calculate a geographical distance between the first object and the second object. The method and system also may use distance determination in the evaluation of services, and in particular, in pricing services.

17 Claims, 11 Drawing Sheets

METHOD AND SYSTEM FOR DISTANCE DETERMINATION AND USE OF THE DISTANCE DETERMINATION

TECHNICAL FIELD

The present invention relates to the field of geographic distance determination, and in particular, relates to a method and system for geographic distance determination between two objects based on the use of a vertical-horizontal coordinate system. In addition, the present invention relates to a method and system for the use of the distance determination in evaluation of services, and in particular, in pricing of services.

BACKGROUND OF THE INVENTION

Christopher Columbus definitely underestimated the distance between Europe and the Orient in planning the first voyage of the Niña, Pinta and Santa Maria. Of course, the underestimate in Columbus' distance determination resulted from an ignorance of world geography. Columbus' underestimate in the distance determination led to the lack of adequate preparation for a crossing of the Atlantic. Columbus most certainly would have requested more funds from King Ferdinand and Queen Isabella if he knew how far he had to sail to reach land. Columbus' underestimate of the distance that separated Europe from the Orient and the lack of preparation for such a crossing were among the factors that led to extreme hardship in Columbus' crossing of the Atlantic, and to the near mutiny of the crew.

Since the time of Columbus, many advanced methods for the determination of distance between two objects have been developed. On the other hand, often the only way to obtain an accurate determination of distance between two objects is the old-fashioned way, that is, to walk off or otherwise measure the distance through a hands-on determination.

One field still using old-fashioned methods of distance determination is the field of telecommunications. The use of old-fashioned methods in a field of cutting edge technology such as telecommunications is ironic. Nevertheless, the telecommunications industry generally relies on hands-on distance determination methods as part of the procedures for setting prices for telecommunication services. For example, one factor in setting the price for telecommunication services for a particular subscriber or customer is the distance of the customer's premises from the nearest appropriate entry point to the telecommunications network. In most cases, the entry point to the network for the provision of services is a central office (also referred to as a central office switch or C.O.). Generally, a central office is a facility where the line from a customer's telephone equipment is joined to switching equipment to enable connection to one or more of a group of other customers' lines. A typical central office also has multiple trunk circuits that connect the central office to other central offices. Through the connection of central offices and customers' equipment, the public switched telephone network provides local and long distance telecommunications services.

As noted, one factor that an account executive (AE) of a telecommunications service provider must consider in the pricing of services is the distance of the delivery of specified telecommunications services to a customer's premises. Generally, a customer's premises receive all of the customer's telecommunication services from the nearest central office. All central offices provide a common core of services such as the connection of a customer's line to the public switched telephone network. However, certain central offices are configured for additional services such as the provision of an interface to services such as the integrated services digital network (ISDN). If a customer desires special services that are unavailable at the customer's nearest central office, then the services are delivered from a specially equipped central office to the customer's nearest appropriate central office for ultimate delivery to the customer's premises. The special services are said to be "back-hauled" from the specially equipped central office to the customer's central office. The pricing of the telecommunications services to the customer reflects the bifurcated delivery of the different types of services. Specifically, the pricing of the services has two components: (1) the pricing of the services received from the nearest central office (Local Office Channel (LOC)); and (2) the pricing of the services received from the specially equipped central office (Interoffice Channel (IOC)).

Distance plays a factor in the pricing of each of component of services pursuant to the following general formula:

$$\text{Price for services}=[(\text{Distance}\times\text{LOC price})+(\text{Distance}\times\text{IOC price})]$$

Thus, to properly consider the distance factor, the account executive must determine which central office is the nearest central office to provide service to the customer's premises and how far that nearest central office is from the customer's premises. The account executive also must determine whether any special services will have to be delivered from a different central office to the nearest central office for ultimate delivery to the customer, and if so, the distance between a specially equipped central office and the nearest central office. For a lower price, generally, an account executive selects a specially equipped central office that is the nearest such office to the customer's nearest central office. The account executive then uses these distance determinations in the pricing of services to a customer.

Pursuant to the hands-on methods of distance determination, the account executive consults an information source for a description of each of the central offices within the service provider's area that offers the services required by the customer. Then, the account executive somehow determines or "guess-timates" the distance between the customer's premises and an appropriate central office for conventional services. If necessary, the account executive also somehow determines the distance between the selected conventional central office and a specially equipped central office. To provide the customer with the best (most low cost) pricing for telecommunication services, generally the account executive selects the central offices that are the closest in distance to the customer's premises for the provision of the services to the customer. Of course, there may be other factors that lead the account executive to select a central office that is not the closest, but that is the most convenient or expedient for some other reason for the provision of the services to the customer. In any case, the "guess-timates" of the distances between the customer's premises and the selected conventional central office and between the selected conventional central office and the selected specially equipped central office are factors in the pricing of the telecommunication services to the customer.

One method that is used by an account executive to determine the distance between a particular central office and a customer's premises (or other location) is to contact personnel at the particular central office and request specific information with respect to the distance. To respond to the request, the central office personnel use one of several methods to measure or otherwise determine the requested distance. The central office personnel may calculate the requested distance based on information as to the length of telecommunications cable that has been run to a site that is close to the customer's premises. Alternatively, the central office personnel may calculate the requested distance based on the number of telephone poles that exist between the central office and a site that is close to the customer's premises. Given human nature, the central office personnel may simply hazard a guess as to the requested distance. In addition, the provision of a response to the account executive may not be the highest priority of the central office personnel. Delays of hours or even days may occur in responding to the account executive's request.

As may be self-evident, there are two major problems associated with the above-described method of distance determination based on the account executive's request for such information from central office personnel. The first problem is delay and the second problem is inaccuracy.

With respect to delay and inaccuracy in distance determination, these problems are exacerbated by the increasingly competitive environment of the telecommunications industry. An account executive is under a lot of pressure to provide a potential customer with a very competitive price for telecommunications services in a timely, professional manner. If an account executive has to check with central office personnel for a determination of distance, then the account executive is delayed in the provision of the pricing information to the potential customer. The delay may cost the account executive (and thereby, the service provider) the deal with the potential customer.

When an account executive is provided with inaccurate distance information, the account executive is unable to provide an accurate price. If the distance is overestimated, the account executive is likely to offer a higher price to the customer. The high price may scare off the customer into the hands of the competition, or at least, away from certain types of telecommunication services. If the distance is underestimated, then the account executive is likely to offer a lower price to the customer. This lower price may thrill the customer and "land" the deal. However, the low price may cost the telecommunications service provider more than just the difference between the low price and the right price. The low price may fail to comply with applicable federal and state regulations and tariffs for telecommunication services. Failure to comply with applicable regulations and tariffs may result in the imposition of fines and penalties against the service provider. In other words, a service provider risks more in offering a low price based on inaccurate information than just the error in the pricing.

The problems encountered by an account executive in having to contact the personnel at a central office for distance determination have led to the development of other methods of distance determination. For example, the account executive may simply hazard a guess as to the requested distance. As another example, the account executive may actually measure the distance in some fashion. This measurement may be as simple as using a cyclometer to measure the distance. The account executive may "drive" the distance and measure it by use of the vehicle's odometer or trip meter. As with the method involving the request to central office personnel, these alternative methods of determining the distance between a customer's premises and a central office result in delays and inaccuracies, as well as other problems.

The problems in the methods of distance determination have been discussed in the context of the telecommunications industry. However, the necessity of determining the distance between two objects or points and the problems associated therewith are not unique to that industry. There are many industries and fields of human endeavor to which the above discussion applies. For example, the package shipping industry including companies such as Federal Express Corporation and United Parcel Service of America, Inc. need to determine the distance between two objects for a whole host of reasons that include, inter alia, a determination of prices for shipping services between those objects.

Accordingly, there is a need for a system for the determination of geographic distance between two objects that provides the determination of distance quickly and accurately. There is a further need for a system for the quick and accurate determination of geographic distance so that the distance determination may be used in the quick and accurate pricing of services. In addition, there is a need for a system for the pricing of services based on accurate and quick distance determination.

SUMMARY OF THE INVENTION

The present invention satisfies the need in the prior art of a system that determines the geographic distance between two objects quickly and accurately. The present invention also satisfies the need in the prior art of a system of evaluating services based on accurate and quick distance determination, and in particular, in pricing services based on distance determination.

Generally stated, the present invention is a method and system for determining the geographical distance between a first object and a second object based on the use of a vertical-horizontal coordinate system. First identification information for the first object is provided, and a first set of vertical-horizontal coordinates corresponding to the first object is determined. Similarly, second identification information for the second object is provided, and a second set of vertical-horizontal coordinates corresponding to the second object is determined. The first and second sets of vertical-horizontal coordinates are used to calculate a geographical distance between the first object and the second object. In addition, the geographical distance may then be used to price services provided between the first object and the second object.

The present invention also generally provides a computer system for determining the geographical distance between a first object and a second object based on the use of a vertical-horizontal coordinate system. The system includes a vertical-horizontal coordinate database that includes a plurality of sets of vertical-horizontal coordinates, a central processing unit operative to communicate with the vertical-horizontal coordinate database, a display device coupled to the central processing unit, an input device coupled to the central processing unit with the input device being operative to receive first identification information corresponding to the first object and to receive second identification information corresponding to the second object. In the system, the central processing unit is operative to read the first identification information, and in response thereto, to obtain a first set of vertical-horizontal coordinates corresponding to the first identification information from the vertical-horizontal coordinate database. The central processing unit also is operative to read the second identification information, and in response thereto, to obtain a second set of vertical-horizontal coordinates. In addition, the central processing unit is operative to use the first set of vertical-horizontal coordinates and the second set of vertical-horizontal coordinates to calculate the geographical distance between the first object and the second object. Further, the central processing unit is operative to cause the display device to display the geographical distance. In addition, the central processing unit of the computer system may be operated to use the geographical distance to price services provided between the first object and the second object.

In addition, the present invention generally provides a computer-readable medium on which is stored a computer program for determining the geographical distance between a first object and a second object based on the use of a vertical-horizontal coordinate system. The computer program includes instructions, which, when executed by a computer, perform the steps of reading first identification information identifying the first object, using the first identification information to determine a first set of vertical-horizontal coordinates corresponding to the first object, reading second identification information identifying the second object, using the second identification information to determine a second set of vertical-horizontal coordinates corresponding to the second object, and using the first set of vertical-horizontal coordinates and the second set of vertical-horizontal coordinates to calculate the geographical distance between the first object and the second object. In addition, the computer program may further include instructions, which, when executed by the computer, may use the geographical distance to price services provided between the first object and the second object.

Therefore, it is an object of the present invention to provide an improved system that determines the geographic distance between two objects quickly and accurately.

It is also an object of the present invention to provide an improved system for the quick and accurate determination of geographic distance so that the distance determination may be used in the quick and accurate evaluation of services.

In addition, it is an object of the present invention to provide an improved system for the pricing of services based on accurate and quick distance determination.

That the present invention and the preferred embodiments thereof overcome the drawbacks set forth above and accomplish the objects of the invention set forth herein will become apparent from the detailed description of the preferred embodiment to follow.

DETAILED DESCRIPTION

I. Nomenclature of the Specification

Figure 1:
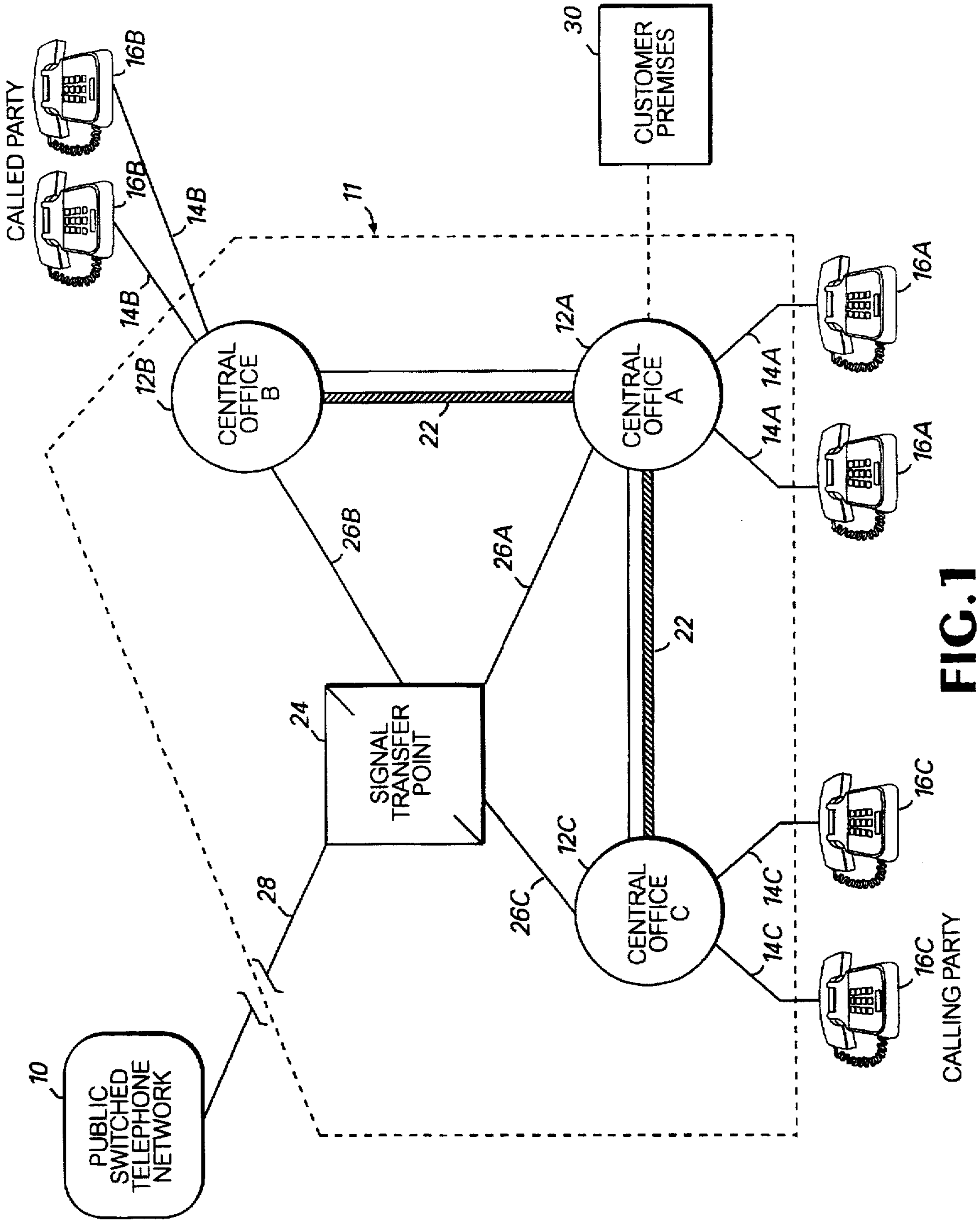
FIG. 1 is a block diagram of a representative portion of the public switched telephone network.

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of this discussion, a "process" is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It also should be understood that manipulations within the computer are often referenced as terms such as adding, comparing, moving, etc. which terms are often associated with manual operations performed by a human operator. The operations described herein are generally machine operations performed in conjunction with a human operator or user that interacts with the computer. The machines used for performing the operation of the present invention, as will be understood, include general purpose digital computers or other similar computing devices.

In addition, it should be understood that the program, processes, methods, etc. described herein are unrelated to or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

II. Description of a Telecommunications Network

Referring now to the drawings, in which like numerals indicate like elements throughout the several figures, the present invention and the preferred operating environment will be described. Generally stated, the present invention is a method and system for determining the geographical distance between a first object and a second object based on the use of a vertical-horizontal coordinate system. The preferred embodiment is described in the context of a computer program that is used by personnel of a telecommunications service provider in pricing telecommunication services for a customer or potential customer based on distance determinations. It will be appreciated, however, that the present invention with relatively minor changes may be used in connection with many other fields of human endeavor. As a context for the discussion of the preferred embodiment, a general description of a telecommunications network is first presented below and is followed by a detailed description of the preferred embodiment in the telecommunications context.

FIG. 1 is a block diagram of a representative portion of the public switched telephone network (PSTN) 10 and an illustrative portion 11 of the PSTN. In particular, the portion 11 of the PSTN 10 illustrates a part of the Advanced Intelligent Network (AN) of a typical local exchange carrier.

The Advanced Intelligent Network (AIN) comprises a plurality of central offices, which are indicated as central office A 12A, central office B 12B, and central office C 12C in FIG. 1. A central office sometimes is referred to as a "switch" and the terms are used interchangeably herein. Central offices 12A, 12B, 12C have a plurality of customer lines commonly designated as 14 connected thereto. The connection between a customer's premises to a central office is commonly referred to as the local office channel (LOC). Each customer line 14 is connected to a piece of terminating equipment including a plurality of telephones commonly designated as 16. Although telephones are illustrated as the pieces of terminating equipment in FIG. 1, those skilled in the art will understand that such pieces may include other telecommunication devices such as facsimile machines, computers, modems, etc. The terminating equipment may also include generally more sophisticated customer telecommunications equipment such as a public branch exchange (PBX), Digital Service Unit/Channel Service Unit (DSU/CSU), multiplexers, Unix/ NOVELL servers, timers, alarm systems, etc.

In FIG. 1, central offices 12 are interconnected by a plurality of trunk circuits indicated as 22. The trunk circuits that connect central offices are also referred to herein as interoffice channels or "IOCs". It will be understood that central office trunking in a typical urban environment is not limited to a daisy chain arrangement implied by FIG. 1. In other words, in a typical network, trunk circuits exist between central offices 12 and central offices (not shown) that service other pieces of terminating equipment (not shown). In addition, central offices may be linked by a ring-typed arrangement.

With respect to the provision of telecommunication services, it should be noted that a particular customer's premises are generally assigned a particular central office for the provision of services. Referring to FIG. 1, customer premises 30 generally would be assigned the nearest central office (central office A 12A) for the delivery of telecommunication services. However, to misquote Gertrude Stein: "a central office is not a central office is not a central office." In other words, the central office assigned to a particular customer's premises may not be able to provide all of the services required or desired by a customer. In that case, the desired services are brought from another central office to customer's assigned central office thereby being delivered ultimately to the customer. In the jargon of the telecommunications industry, the desired services are said to be "backhauled" to the customer's assigned central office from the central office equipped with the desired services. Referring to FIG. 1, if central office A 12A is not equipped to provide all the telecommunication needs of customer premises 30, then the other services may be backhauled from another central office such as from central office B 12B or central office C 12C.

The general telecommunications architecture discussed above is magnified when consideration is given to a wider geographic area that includes multiple local exchange carriers or other service providers. In that case, however, interexchange carrier switches are present in the model. Generally, interexchange carrier switches are limited to switching long distance trunk circuits.

Referring again to FIG. 1, each of the central offices 12 is connected to a local signal transfer point (STP) 24 via respective data links 26A, 26B, 26C. STP 24 is a multi-port high speed packet switch that is programmed to respond to the routing information in the Signaling System 7 protocol, and to route a data packet to its destination. Typically, a signal transfer point such as STP 24 is connected to a local service control point (SCP)(not illustrated) over an SS7 data link 28 and thence, to the other elements of the PSTN 10. Thus, each of central offices 12 is connected to the public switched telephone network 10, and to each other.

III. Description of the Operation of the Preferred Embodiment

Still referring to FIG. 1, a general explanation is provided below of the use of the preferred embodiment of the present invention by an account executive (AE) in the pricing of certain telecommunication services to a customer, followed by a step-by-step description of the preferred embodiment.

As noted in the background section of this application, one factor that an AE must consider in the pricing of services is the distance of the delivery of specified telecommunications services to a customer's premises. To properly consider the distance factor, the AE uses the present invention to determine which central office is the nearest "appropriate" central office to the customer, and to determine the geographic distance between the customer's premises and this nearest central office. The term "appropriate" is placed in quotes because factors other than simply distance may play a part in the selection of a central office for delivery of services to a particular customer's premises. For simplicity of discussion, reference is made to the "nearest" central office, but shall be read to include the nearest "appropriate" central office.

After the AE determines the distance between the customer's premises and the nearest central office, the AE then uses the determined geographic distance to price the telecommunication services that are to be provided to the customer's premises from the nearest central office. The connection between the customer's premises and the nearest central office is referred to as the local office channel (LOC), and thus, the pricing for this segment of telecommunications services is referred to as LOC pricing. Referring to FIG. 1, to price telecommunication services for customer premises 30, the AE determines that central office A 12A is the nearest central office, and determines the distance between customer premises 30 and central office 12A. The AE then determines an LOC price for these services based on the determined distance. Referring to FIG. 1, central office 12A may be the nearest central office to customer premises 30, but central office 12A may not be able to provide certain services desired by the customer. The desired services may have to be delivered (backhauled) from another central office. The AE determines that central office C 12C is the nearest appropriately equipped central office, and determines the distance between central office A 12A and central office C. The AE then determines an IOC price for these special services based on the determined distance. The total price to the customer includes both the IOC price and the LOC price.

Let's consider an example. An enterprising account executive, A. E. Chris, decides to land a new customer, Bowie Enterprises International (Bowie) by offering telecommunication services at a low low service fee. Bowie's local offices are located at customer premises 30, FIG. 1.

To help A. E. Chris with the pricing information for Bowie, A. E. Chris preferably uses the computer sitting on his desk (also referred to as a computer system) to run the program MILEAGE TOOL (BellSouth Corporation, Atlanta, Ga.) for the necessary distance determination. In the preferred embodiment, the computer is a general purpose personal computer that is networked (in a manner well known to those skilled in the art) with other computers of the telecommunications service provider such that A. E. Chris has access to the resources of certain other computers and databases. In particular, the preferred computer is hooked to a local area network/wide area network (LAN/WAN) that uses the transmission control protocol/internet program (TCP/IP) and NOVELL servers for an exchange of information with SYBASE and PARADOX databases. The computer preferably also has networked access to the BellSouth Operation Service (BSSIP) that, in turn, has access to the LOCATE-IT service (database) made available by Bell Communications Research (BELLCORE), Piscataway, N.J. With respect to the program, MILEAGE TOOL is a program written in PARK PLACE/SMALL TALK for use in a Windows® version 3.1 environment.

A. Description of the components of the preferred computer system

Figure 2:
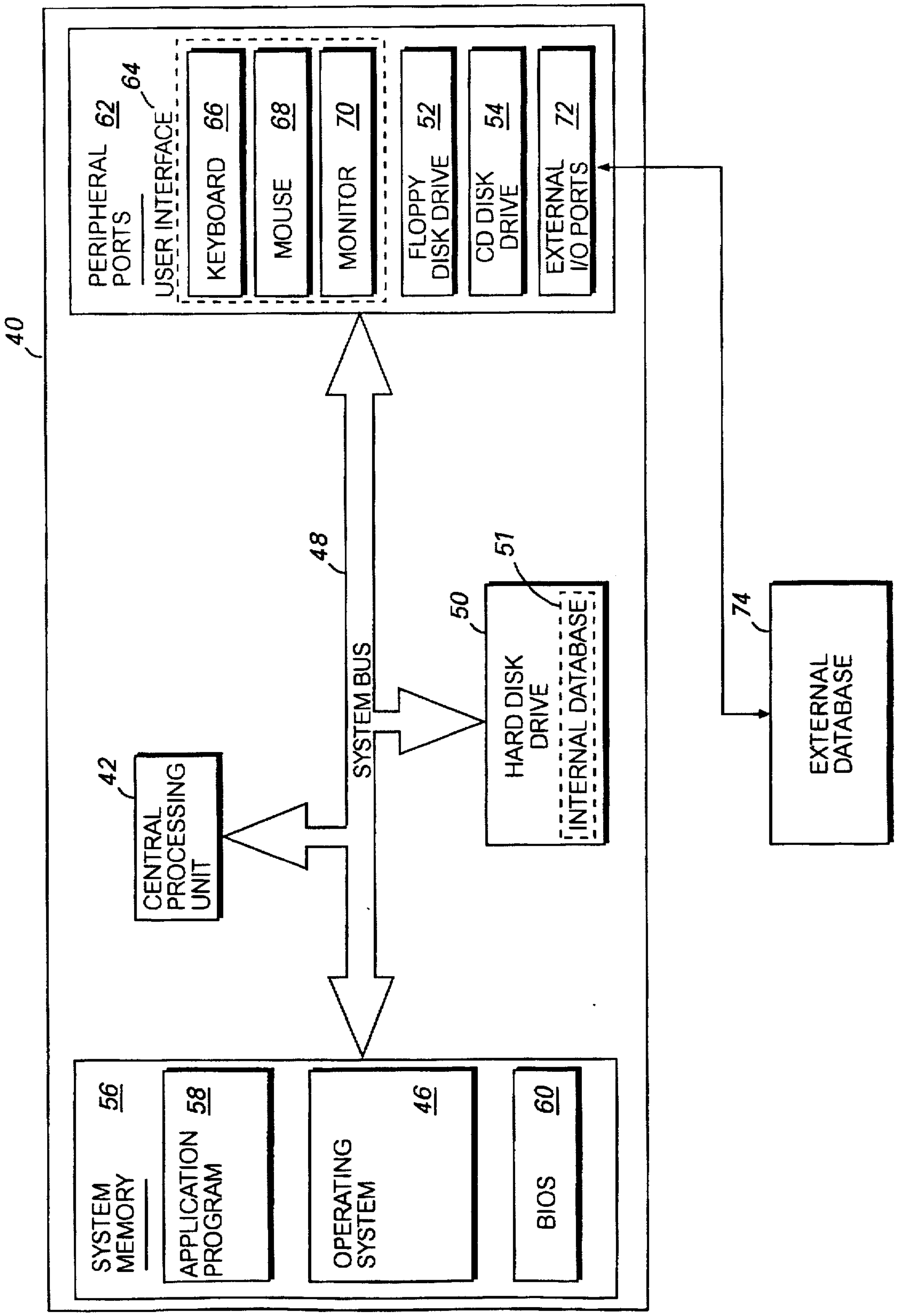
FIG. 2 is a block diagram of the components of a computer system used in connection with the preferred embodiment of the present invention.

FIG. 2 is a block diagram of the basic components of a computer system such as is used in connection with the preferred embodiment of the present invention. The computer system 40 includes a central processing unit (CPU) 42 that operates the computer system 40 in conjunction with a graphical user interface-based operating system 44 to retrieve, process, store, and display data. The CPU 42 typically is implemented as a microprocessor, such as the models 80386 or 80486 manufactured by Intel Corporation, Santa Clara, Calif. The CPU 42 communicates, by means of control, address, and data signals, with the operating system 46 and with the remaining components of the computer system 40 through a system bus 48.

The operating system 46 includes a set of computer programs that control the internal functions of the computer system 40, thereby allowing the computer system 40 to run application software. The operating system 46 is installed in a mass storage device, such as a hard disk drive 50, a floppy disk drive 52, a CD disk drive 54, or a ROM chip (not shown). During boot up (initialization) of the computer system 40, the operating system 46 is loaded into a system memory 56. In the preferred embodiment, the operating system 46 is the "WINDOWS" operating system manufactured by Microsoft Corporation of Redmond, Wash. Those skilled in the art will understand that the invention can be implemented in other graphical user interface operating systems, such as the "OS/2" operating system manufactured by IBM and the "MACINTOSH" operating system manufactured by Apple Computer, Inc., and the HP/UNIX operating system by Hewlett Packard, Inc.

A computer-implemented application program 58 is also loaded into the system memory 56 from the hard disk drive 50, the floppy disk drive 52, or the compact disk (CD) drive 54. The application program 58 operates generally in conjunction with the operating system 46 to provide a graphical user interface. As noted above, the preferred embodiment of the present invention is implemented through an application program entitled MILEAGE TOOL. As will be understood by those skilled in the art, this invention may be implemented through other programs, methods or systems. The hard disk drive also may include an internal database 51 for the storage of information as will be well understood by those skilled in the art.

A basic input/output system (BIOS) program 60 is stored in the system memory 56 along with the operating system 46. The BIOS program 60 supplies the device-level control or support services for the primary input/output devices of the computer during the boot process. After a boot, the BIOS program 60 accepts requests from the application program 58 and from the operating system 46 running on the computer system 40 and performs input/output services as requested by those programs. The functions and operations of conventional BIOS programs are well known and will not be further described herein.

A series of peripheral ports 62 are provided on the system bus 48 for receiving and transmitting data via a user interface 64. The user interface 64 includes a keyboard 66 and an input device for entering data. As used herein, the phrase "input device" means a mouse, trackball, track pad, or any other pointing device for positioning a cursor on a computer screen. In the preferred embodiment, the input device is a mouse 68. Data is graphically displayed by a monitor 70 (also referred to as a display device).

The mouse 68 operates in conjunction with a cursor displayed on the monitor 70. The cursor is positioned by means of a roller ball on the underside of the mouse 68. The roller ball generates directional commands as the mouse 68 is moved by the user. That mouse movement is then translated by the operating system 46 into movement of the cursor on the monitor 70. As is well known in the art, a user can select, launch, and move objects by moving and clicking the mouse 68.

The peripheral ports 62 also include external I/O ports 72 for networking of computer system 40 with other computers, databases, etc. such as external database 74. As will be well known to those skilled in the art, such networking may be accomplished through a local area network (LAN), wide area network (WAN), a LAN/WAN combination, the InterNet, or other systems. As noted above, in the preferred embodiment, computer system 40 is a P/C (486/33 mHz) IBM clone that is networked through NOVELL/Cisco Router's that pass TCP/IP and relate to the host file.

B. Description of the MILEAGE TOOL program As noted above, the preferred embodiment of the present invention is implemented through use of the program MILEAGE TOOL. Although the preferred embodiment is implemented through the MILEAGE TOOL program, the present invention may be implemented in other programs and through other means as those skilled in the art will understand from the description of the operation of the MILEAGE TOOL program, and in particular, from the explanation of the process steps of the present invention.

To make the MILEAGE TOOL program as easy as possible to use, the program works with the computer system's operating system to provide a graphical user interface (GUI) as a convenient means of exchanging information between the user and the computer system. Generally, a graphical user interface is a type of display format that enables the user to choose commands, start programs, and see lists of files and other options by pointing to graphical representations (icons or fields) and lists of menu items on the screen. A graphical user interface readily provides a user with access to files and to functions of the files. Graphical user interfaces are used on the APPLE MACINTOSH® and by such computer programs as MICROSOFT WINDOWS® and the OS/2 PRESENTATION MANAGER® system.

A user typically interacts with a graphical user interface through an input device such as the keyboard or a mouse or a combination of both. On the graphical user interface, icons typically represent computer objects such as files and folders that can be manipulated by the user. A user initiates manipulation of an object by selecting the icon representing the object. This selection is accomplished by positioning the cursor over the icon associated with the object and clicking a button on the mouse. The file or folder represented by the icon is launched for manipulation by the user by selecting the icon and repeating the clicking of the button on the mouse (i.e., double-clicking). In addition, a graphical user interface will have fields for the entry of information by the user or for display of information requested by the user and supplied by the computer. Generally, a user may enter information in a field by clicking on a field or otherwise as will be well known to those skilled in the art.

FIGS. 3A–3L illustrate screen displays of exemplary customer to central office templates of a computer program of a type which interacts with the preferred embodiment of the present invention. In particular, these screen displays are part of the graphical user interface used in connection with the preferred MILEAGE TOOL program. Those skilled in the art will understand the screen displays include functions common to graphic user interfaces that will not be described in detail herein such as the functions of print, cancel, etc.

Figure 3A:
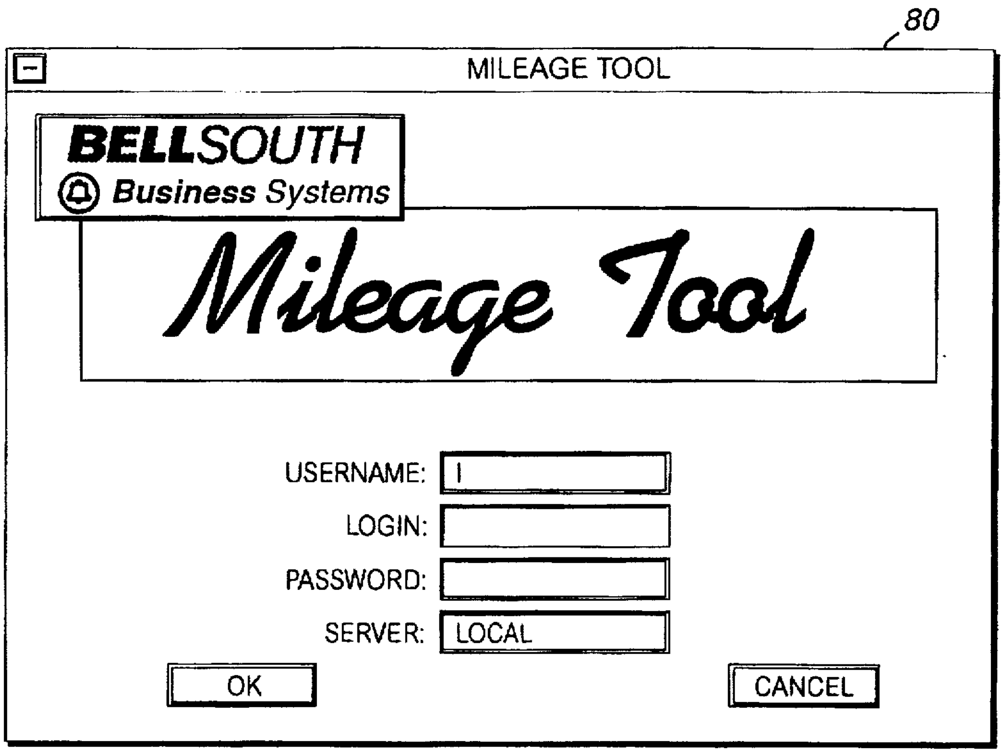
FIGS. 3A–3L illustrate screen displays of a computer program of a type used with the preferred embodiment of the present invention.
Figure 3B:
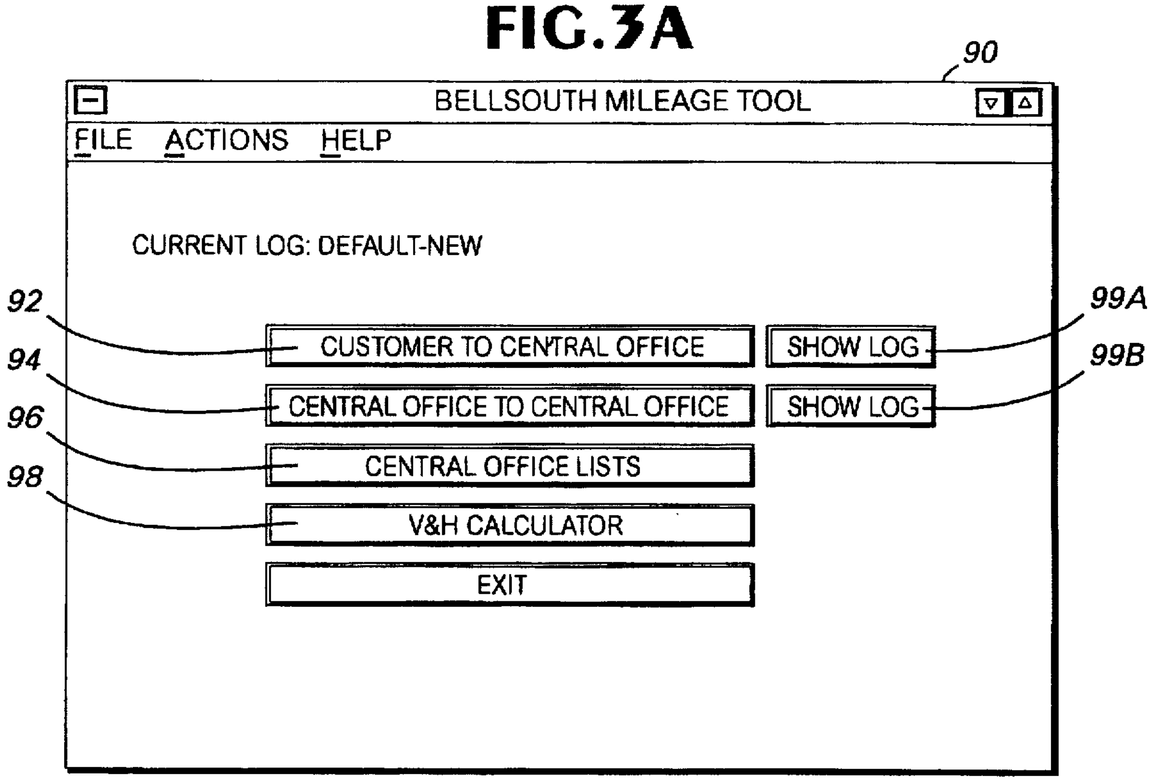

Referring to the example discussed above wherein A. E. Chris is taking steps to land Bowie Enterprises International as a customer for telecommunication services, FIG. 3A illustrates the first screen display 80 A. E. Chris sees as a result of calling up the MILEAGE TOOL program on his computer. After securing access to the program through the provision of appropriate information (username, login, password, etc.) as will be well understood by those skilled in the art, A. E. Chris is presented with a screen display 90 such as illustrated in FIG. 3B. Screen display 90 includes a list of functions or operations preferably provided by the MILEAGE TOOL program. In particular, screen display 90 includes the following choice of functions: Customer to Central Office 90; Central Office to Central Office 92; Central Office Lists 94; V&H Calculator 98; and Show Log 99A-B. The Customer to Central Office 90 function and Central Office Lists 94 function are discussed in greater detail below in connection with FIGS. 3C–3L. The other functions also are discussed below as follows: Show Log 99A—FIG. 4; Show Log 99B—FIG. 7; Central Office to Central Office 92—FIG. 6; and V&H Calculator 98—FIG. 8.

As a first step in pricing telecommunication services for Bowie, A. E. Chris has to determine the nearest central office to Bowie's premises, and then has to determine the distance between Bowie's premises and the selected nearest central office. To make these determinations, A. E. Chris selects the Customer to Central Office 90 function.

Figure 3C:
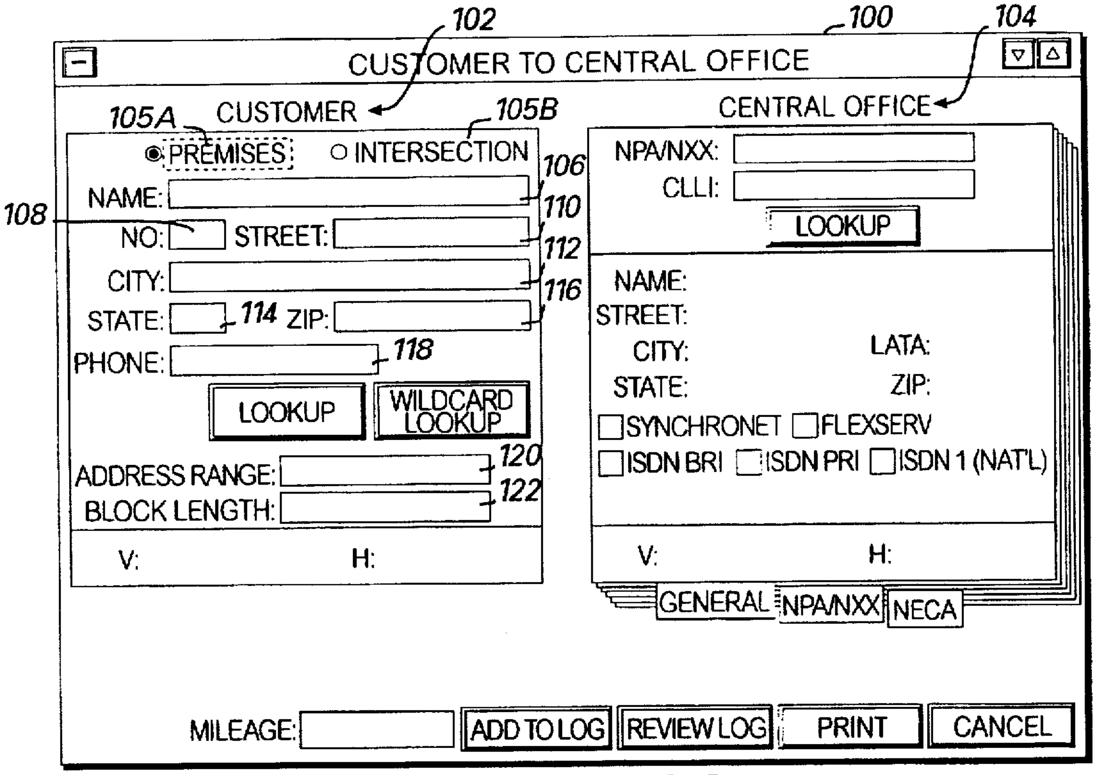

FIG. 3C illustrates the screen display 100 A. E. Chris sees after selection of the Customer to Central Office 90 function. Screen display 100 of FIG. 3C comprises two general sections: Customer information 102 and Central Office information 104. To determine the nearest central office to Bowie's premises, A. E. Chris must first provide some input about the customer, Bowie (first object). To proceed, A. E. Chris must know (1) the street on which the premises of Bowie are located and the corresponding city and state; or (2) an intersection near the premises of Bowie and the corresponding city and state. The input information that A. E. Chris provides about Bowie's premises determines the type of informational search that is conducted by the preferred embodiment. If A. E. Chris inputs street information, then a "Premises" type search is conducted with respect to the location of Bowie's premises. If A. E. Chris inputs intersection information, than an "Intersection" type search is conducted with respect to the location of Bowie's premises. The differences in these searches will become apparent from the detail provided below. If A. E. Chris knows the street on which Bowie's premises are located, then the A. E. Chris clicks the Premises 105A button in the Customer information 102 section of screen display 100. If A. E. Chris knows the intersection near which Bowie's premises are located, then A. E. Chris clicks the Intersection 105B button in the Customer information 102 section of screen display 100.

1. Customer information input—premises In our example, A. E. Chris chooses to proceed with the customer's street address, and so A. E. Chris clicks the Premises 105A button on screen display 100. A discussion of what would happen if A. E. Chris had clicked the Intersection 105B button follows after this "Premises" discussion.

Still referring to FIG. 3C, the Customer information 102 section of screen display 100 contains fields for input of customer information as follows:

name 106;

no. 108;

street 110;

city 112;

state 114;

zip 116;

phone 118;

address range 126; and block length 122.

Of these fields of information, the following fields preferably must be supplied with information to determine the desired distance:

street 110 (maximum of 42 characters allowed);

city 112 (maximum 31 characters allowed); and state 114 (maximum 2 characters allowed).

The information supplied in these fields is used in the process of the distance determination. The information also is useful for other purposes such as log entry, etc. as will be discussed below. The other section of screen display 100 which is Central Office information 104 is discussed more particularly below in connection with FIGS. 3K and 3L.

Figure 3D:
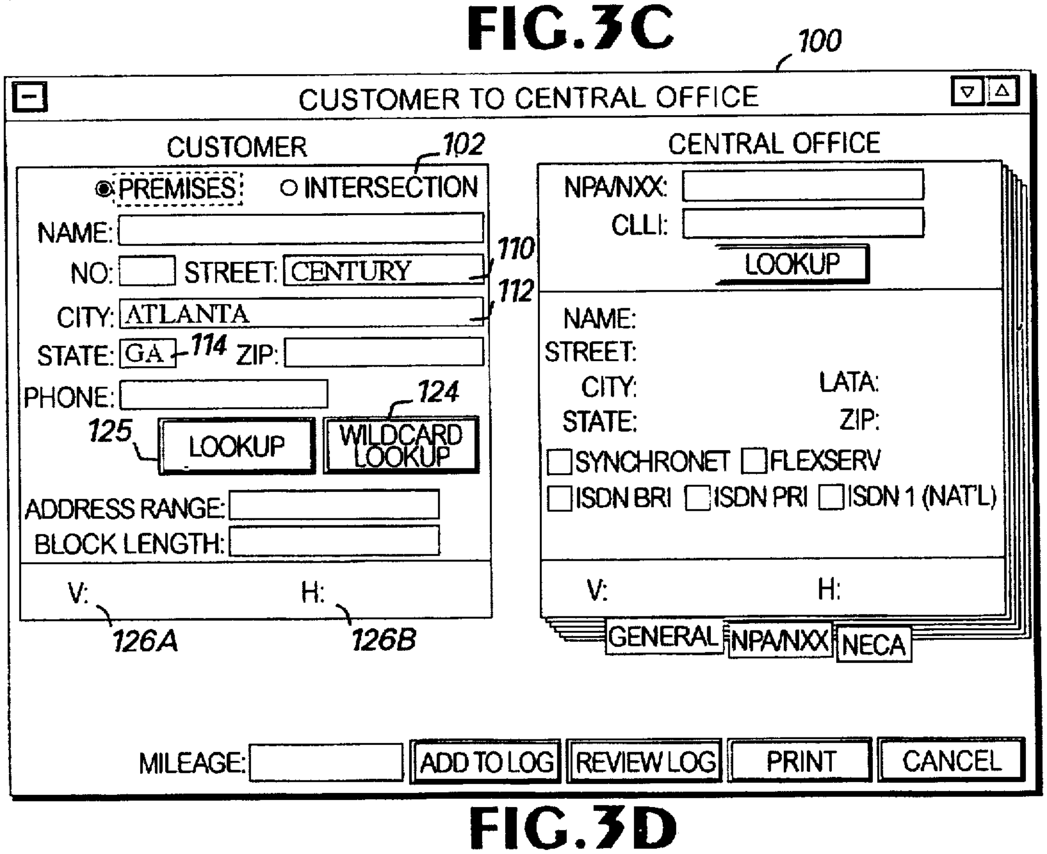

As illustrated in FIG. 3D, A. E. Chris has input information into the customer information section 102 of screen display 100 regarding Bowie Enterprises International as follows:

street 110 "Century";

city 112 "Atlanta";

state 114 "GA"

To proceed further with the determination of distance from the premises of Bowie Enterprises International to the nearest central office, A. E. Chris clicks on the Wildcard Lookup button 124 in the Customer information 102 section of screen display 100. In this example, Wildcard Lookup 124 is used rather than Lookup 125 because A. E. Chris had only minimal customer information. Wildcard Lookup 124 results in a broader search for relevant information as will become apparent to the reader from the discussion that follows. The desired result of the Wildcard Lookup 124 is a display of information in the fields of V: 126A and H: 126B in the Customer information 102 section of the screen display 100. More particularly described, the result of the selection of the Wildcard Lookup button 124 is that the MILEAGE TOOL program consults a database in a manner well known to those skilled in the art for an entry that includes information matching the information supplied by A. E. Chris in the street 110, city 112 and state 114 fields of screen display 100. The MILEAGE TOOL program consults a database known as LOCATE-IT. This database is an external database and is maintained at/by BellCore. The MILEAGE TOOL program accesses this database by remote program calls as will be well known to those skilled in the art.

More particularly described, the LOCATE-IT database includes entries of assigned street addresses, street intersections, and other accompanying information for developed areas of all fifty states plus Puerto Rico. In addition to the names of streets in the United States and Puerto Rico, the LOCATE-IT database contains information related to each street in its database such as the identity of the town and state wherein the street lies, the address ranges on the street, the block length associated with a particular address range of the street, identification of the street by intersection with other streets, and the appropriate vertical (V) and horizontal (H) (or V&H or V&H) coordinates for the particular address range of the street or intersection of the street with other streets. The LOCATE-IT database also includes other related information. Those skilled in the art will understand that in addition to or instead of the LOCATE-IT database, any other databases or systems that include V&H coordinate information corresponding to geographical locations may be used in connection with the process of the present invention. In addition, those skilled in the art will further understand that such other database of V&H coordinate information may be stored on an internal database of a computer such as internal database 51 in FIG. 2 and used with the present invention.

The V&H coordinates for each particular address range of a street in the LOCATE-IT database are derived from a well known V&H grid coordinate system originally developed by AT&T Bell Laboratories. The V&H system was developed by AT&T as a tool for the calculation of distance for use in the pricing of long distance services. Over the years, the original V&H system has been expanded through the addition of many more sets of V&H coordinates representing many more assigned street addresses based on census and other data. The V&H system now is maintained by BellCore (NECA files are referenced in the Federal Communication Commission #4 tariff). This V&H system is sometimes referred to as the TIGER files of V&H coordinates. Additional information regarding the V&H system may be obtained from BellCore.

Figure 3E:
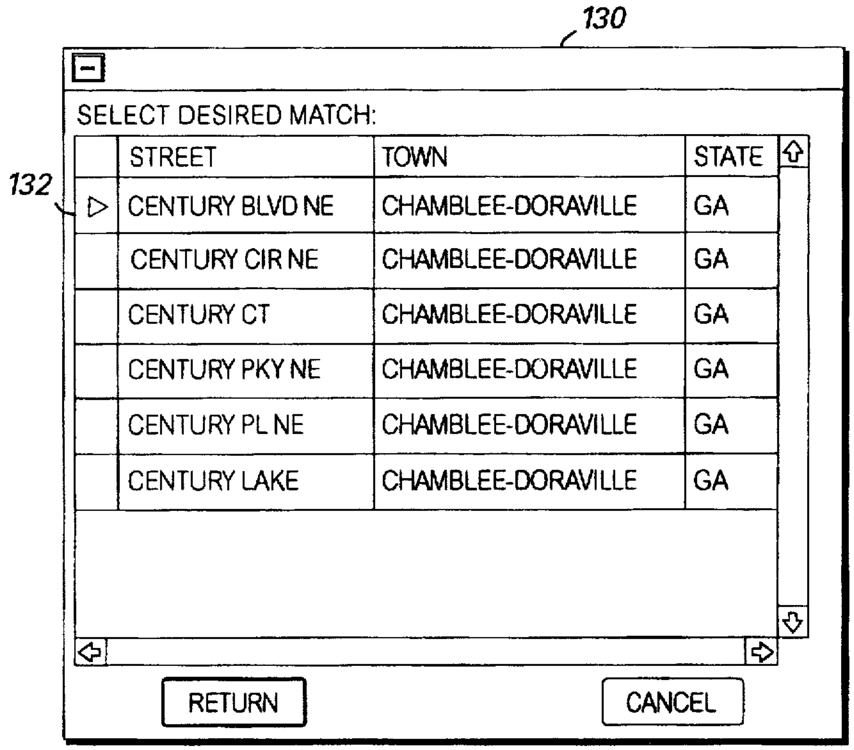

As noted above, the desired result of the Wildcard Lookup 124 step is a display of information in the fields of V: 126A and H: 126B in the Customer information 102 section of the screen display 100. Referring again to FIG. 3D and to our example, unfortunately, the information supplied by A. E. Chris is not enough for the return of information in the V&H fields 126. Instead, as a result of the Wildcard Lookup 124 action, A. E. Chris is presented with a screen display 130 as illustrated in FIG. 3E. The screen display 130 illustrates a selected portion of the LOCATE-IT database as discussed above. In particular, as a result of the entry of the term "Century" in street field 110 on screen display 100 (and the selection of the Lookup step), the MILEAGE TOOL program consults the LOCATE-IT database for V&H coordinates. In our example, the LOCATE-IT database did not have enough information to find a suitable match for returning V&H coordinates. Instead, the LOCATE-IT database found six streets (near Atlanta, Ga.) in its database that included the term "century". Thus, the LOCATE-IT database through the MILEAGE TOOL program, as illustrated in FIG. 3E, returned screen display 130 with information regarding the six streets including the term "century". In contrast, if A. E. Chris had selected the Lookup 125 button instead of the Wildcard Lookup 124 button, A. E. Chris would have been presented with a "Match Not Found" or some similar error message. The Lookup 125 button initiates a search based on the input customer information in the LOCATE-IT database that is of a much narrower scope, i.e., nearly an exact match to the input information. The Lookup 125 button is used for a quick lookup when a customer's exact address is known On the other hand, the Wildcard Lookup 124 step is more forgiving in that it will present the user with information to help the user ultimately find an exact matching entry with pertinent information.

Figure 3F:
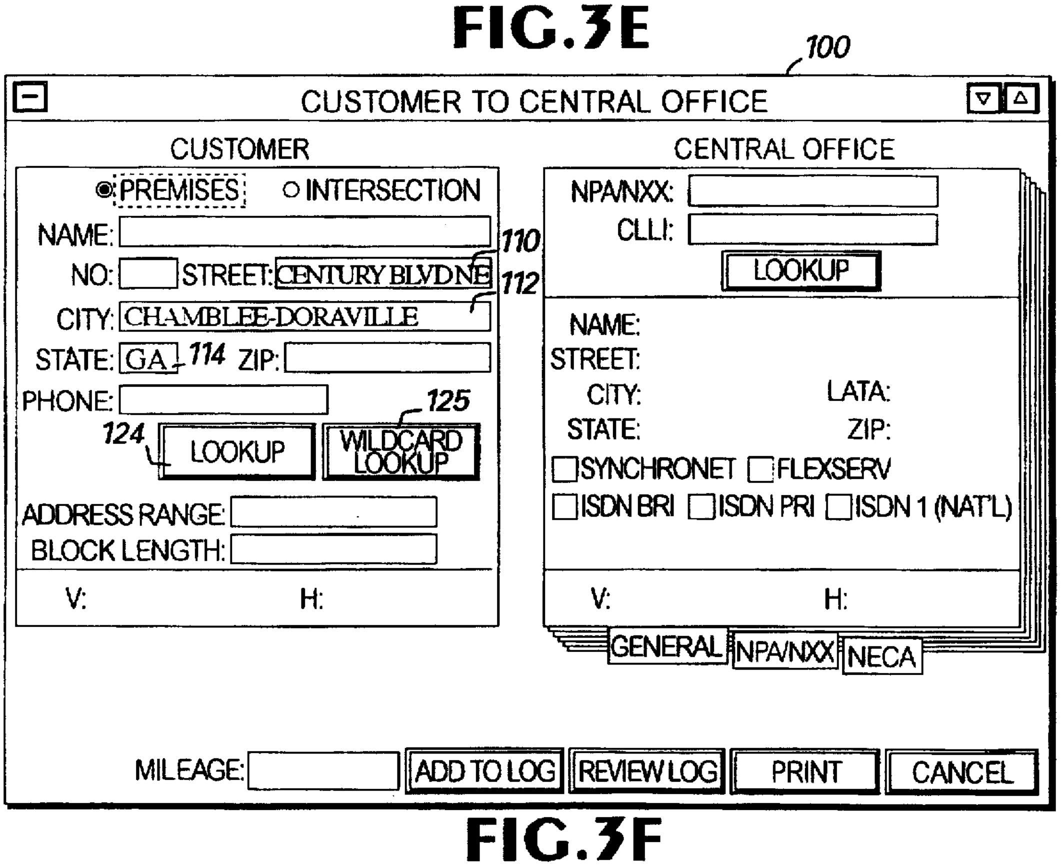

Referring again to our example, from the list of six "century" streets, A. E. Chris selects the first entry 132 "Century Blvd NE". (Of course, A. E. Chris could have quit the program, selected a different entry, etc. The selections in the A. E. Chris example are made so as to more fully describe the preferred embodiment.) In response to the selection of "Century Blvd NE", the present invention preferably causes the Customer to Central Office screen display 100 to reappear with "Century Blvd NE" displayed in the street field 110 and with "Chamblee-Doraville" displayed as a correction in the city field 112 as illustrated in FIG. 3F. In other words, the present invention preferably corrects information input originally by a user as a result of continued interaction with a user. In this example, the present invention changed the information input originally by the user to indicate the proper city (Chamblee-Doraville) associated with the street selected in the database review process (Century Blvd NE). To continue the distance determination session, A. E. Chris once again clicks the Wildcard Lookup button 124.

Figure 3G:
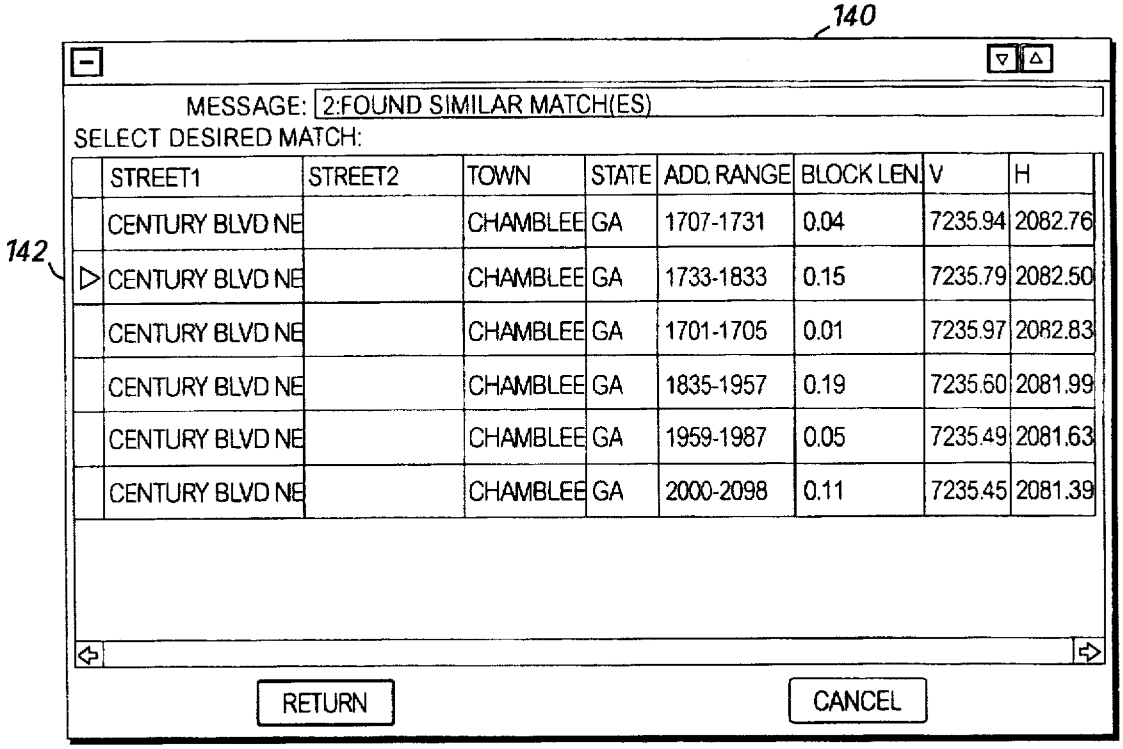

Unfortunately, the information supplied by A. E. Chris is still not enough for the return of information in the V&H fields 126 on screen display 100. Instead, as a result of the Wildcard Lookup action, A. E. Chris is presented with a screen display 140 as illustrated in FIG. 3G. The screen display 140 illustrates another selected portion of the LOCATE-IT database. In particular, as a result of the entry of the term "Century Blvd NF" in street field 110 on screen display 100 (and the selection of the Wildcard Lookup step), the MILEAGE TOOL program consults the LOCATE-IT database for V&H coordinates. In our example, "Century Blvd NE" is still not enough information to return a single set of V&H coordinates. The LOCATE-IT database found six entries for "Century Blvd NE" (in Chamblee, Ga.) with each entry having a different address range. From the list of six "Century Blvd NE" streets, A. E. Chris selects the second entry "Century Blvd NE" with the address entry of 1733–1833.

Figure 3H:
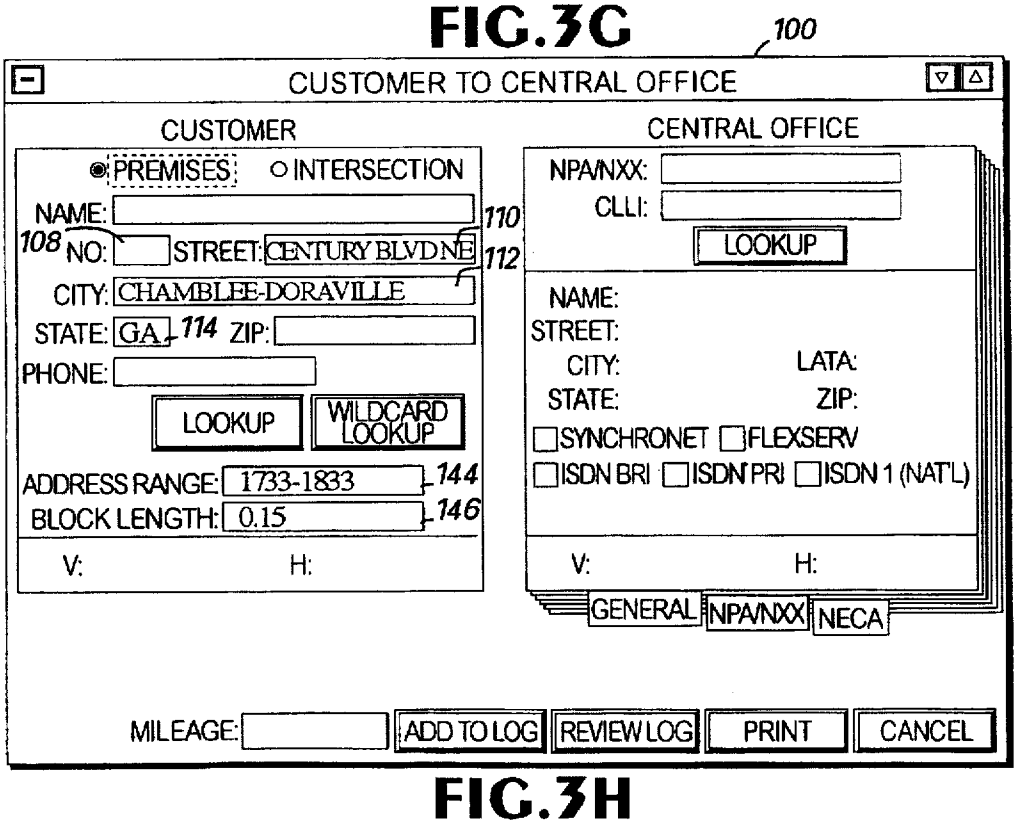

In response to the selection of "Century Blvd NE" with the address entry 1733–1833 from the display illustrated in FIG. 3G, the present invention preferably causes the Customer to Central Office screen display 100 to reappear with the display of additional information. As illustrated in FIG. 3H, "1733–1833" appears in the address range field 144 of screen display 100 and "0.15" appears in the block length field 146.

The present invention preferably includes a feature to assure a user that an exact match of a street address has been found. With respect to screen display 100, the present invention compares any information in the no. field 108 to the information in the address field 144 to verify that an exact match has been found. This comparison and verification between two different fields is carried out in a manner well known to those skilled in the art. The "exact match" feature is further described in the context of the example involving A. E. Chris and Bowie Enterprises International. When A. E. Chris is presented with screen display 100 as illustrated in FIG. 3H, he fills in the No. field 108 to include the "1800" street address of Bowie Enterprises International. In response to the supply of information in the no. field 108, the present invention compares the information in no. field 108 with the information in address range field 144. The result of this comparison is positive because "1800" falls within the designated address range "1733–1833". In the preferred embodiment, the comparison and verification is carried out by another call or transmission to the LOCATE-IT database for confirmation that the entered customer information has an exact match.

Figure 3I:
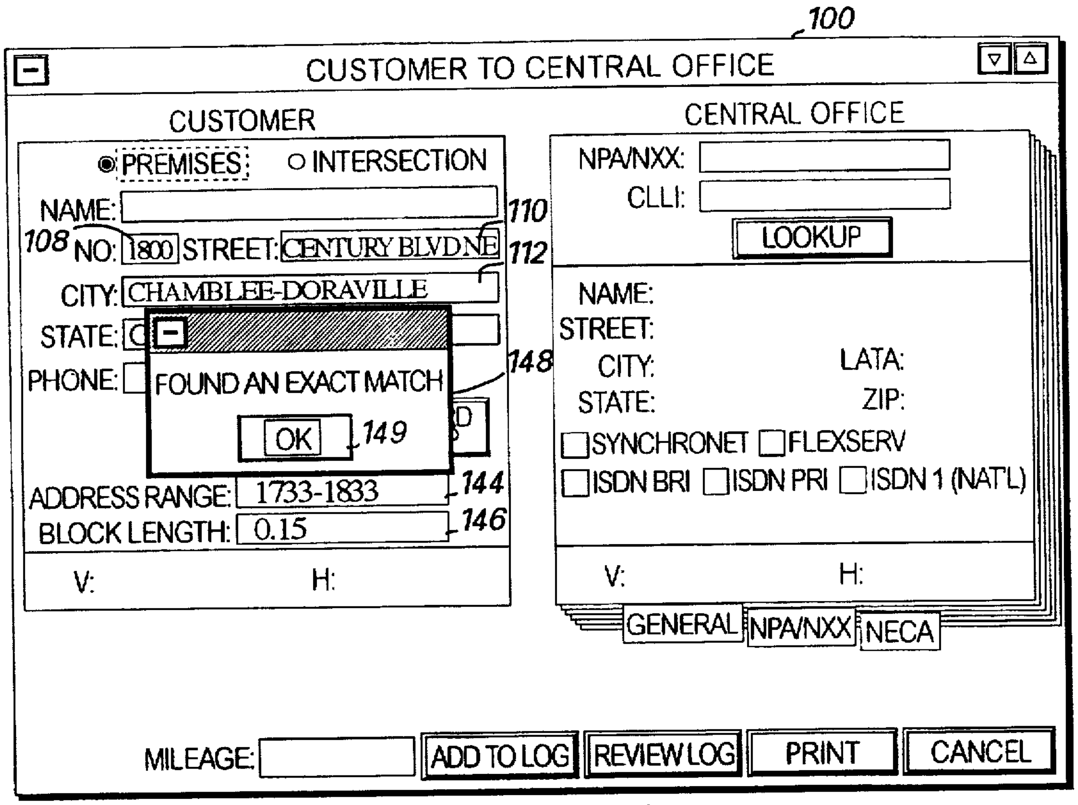

As illustrated in FIG. 3I, the present invention presents the user with a screen display 148 indicating that an exact match of the customer's address was found. Thus, A. E. Chris can be confident in the address information with minimal mental effort. To continue with the distance determination, the user clicks on the "OK" button 149 of screen display 148 as illustrated in FIG. 31. Of course, if the comparison is negative, the user is provided with information as to the lack of an exact match. In that case, the user has several options with respect to continuing the distance determination process. The user may change the address input, cancel the continuance of the process, etc.

Figure 3J:
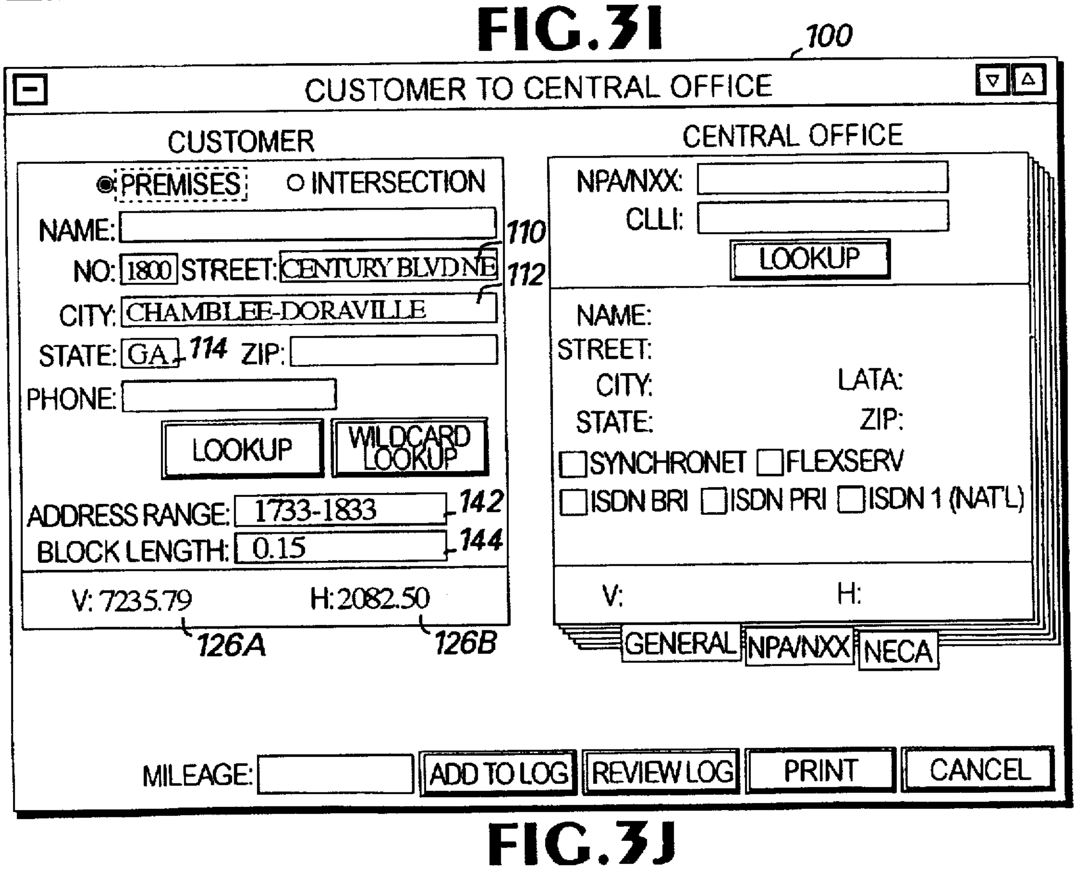

As a result of the customer input information, and Wildcard Lookup action, the V&H coordinates corresponding to the input information are displayed in the respective V&H coordinate fields 126. As illustrated in FIG. 3J, the V&H coordinates are V:7235.79 and H:2082.50 for the 1800 Century Blvd NE address. As noted above, these V&H coordinates are obtained from information in an entry in the LOCATE-IT database.

2. Customer information input—intersection Referring again to FIG. 3C, as noted above, Customer information 102 section provides the user with the choice of proceeding with customer information input (1) by the input of street address, city, state information (Premises 105A); or (2) by the input of information about an intersection near the customer's premises including city, state information (Intersection 105B). In the immediately preceding section, an explanation is provided regarding the process of distance determination based on the selection of Premises 105A button from screen display 100. If the user instead chooses the Intersection 105B button, the Customer information 102 section of screen display 100 provides slightly different fields for input of customer information. In particular, the Customer information 102 section preferably provides a Street 1 field, and a Street 2 field (not illustrated) in addition to the fields discussed above in connection with the Premises 105A selection. The user must supply the input for the Street 1 and Street 2 fields plus city, state information in order to proceed with the distance determination process. Of course, the Street 1 field input corresponds to a first street of a two street intersection in a particular city, state, and the Street 2 field input corresponds to the second street of the intersection.

Once the user has provided the intersection input information (i.e., information in the Street 1 Street 2, city, and state fields), the present invention proceeds essentially the same as discussed above in connection with the Premises 105A selection. The difference is that the present invention uses the intersection input information to find V&H coordinates to display in the fields of V:126A and H: 126B in the Customer information 102 section of the screen display 100. More particularly described, in the preferred embodiment the MILEAGE TOOL program consults the LOCATE-IT database in a manner well known to those skilled in the art for an entry that includes information matching the information supplied by the user in the Street 1 and Street 2, city and state fields. The LOCATE-IT database is set up so that it may be searched for street intersection information within a given city, state.

A search of the LOCATE-IT database may result in several different messages being returned to the user such as an error message ("No such intersection exists). In addition, a search of the LOCATE-IT database may result in one or more messages for additional information so as to help the user narrow the possible solutions to the intersection input information to one address range on a street as generally discussed above in connection with the Premises 105A process, and in particular, as discussed in connection with FIGS. 3E and 3G. A single solution is preferable in order to provide V&H coordinates to display in the fields of V:126A and H: 126B in the Customer information 102 section of the screen display 100.

3. Selection of the nearest central office

Figure 3K:
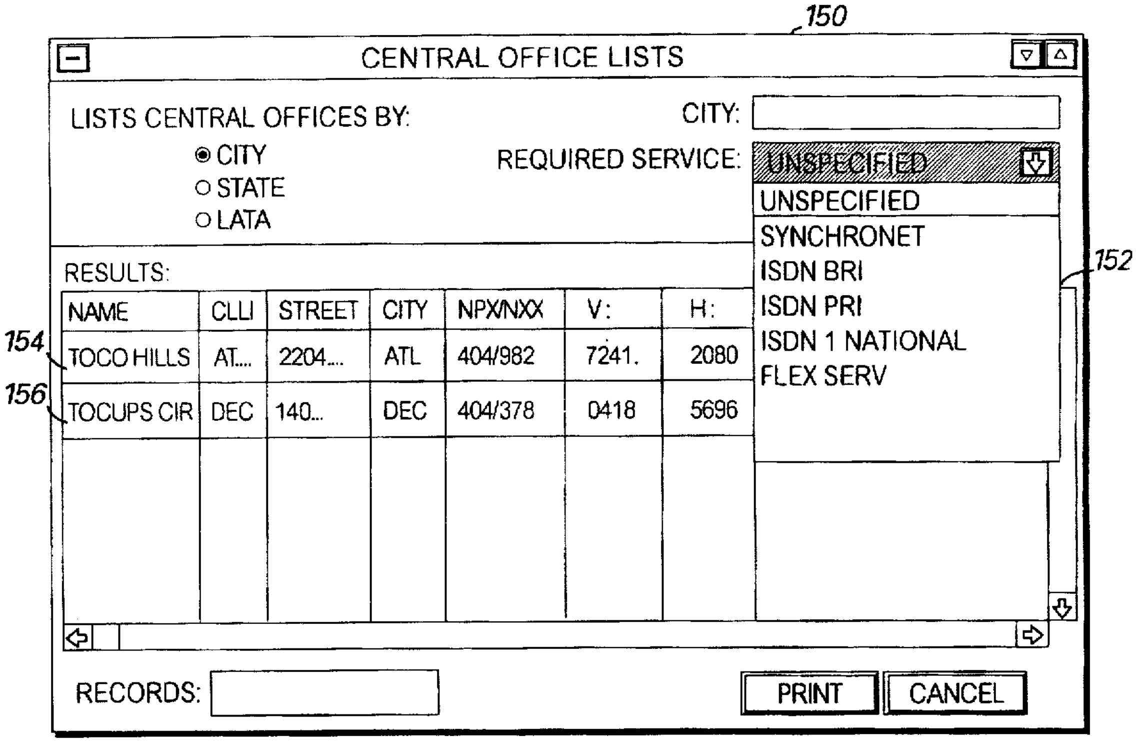

To continue the process of distance determination, the present invention preferably enables a user to select the nearest "appropriate" central office (second object) for the delivery of certain telecommunication services from a table of central offices. In the context of telecommunication service pricing, the "appropriateness" of a central office depends on the type of services or features that are available at a particular central office. FIG. 3K illustrates a table referred to as Central Office Lists 150 that displays information about selected central offices including the features or services available at each central office. The information displayed on the Central Office Lists 150 is derived from a database referred to as the Central Office database. The Central Office database is a compilation of information about central offices in the nine state area served by BellSouth Corporation. This database is maintained at/by BellSouth Corporation, Atlanta, Ga. The Central Office database may be stored in an internal database to a computer such as internal database 51 as illustrated in FIG. 2, or the Central Office database may be stored in an external location (such as external database 74 in FIG. 2) and called as necessary and in a conventional manner by other computers networked to the external database. The MILEAGE TOOL program accesses this Central Office database by conventional means as will be well understood by those skilled in the art. Those skilled in the art will also understand that the selection of an object such as the nearest "appropriate" central office may be accomplished by means other than reference to a database such as the Central Office database. Further, any other database or system that includes information such as provided by the Central Office database may be used in connection with the process of the preferred embodiment of the present invention.

Referring again to FIG. 3K, the Central Office Lists 150 preferably allows a user to view a list of central offices that may be sorted by city, state or local access and transport area (LATA). From this list, the user preferably may select a central office and import information about the central office for use with the other screen displays of the MILEAGE TOOL program such as screen display 100. The Central Office Lists 150 also preferably allows the user to view a list of central offices where each central office in the list is equipped with certain features or services (also referred to as service parameters). In the preferred embodiment, the user may view a list of central offices that have one or more of the following service parameters: Unspecified, SynchroNet, FlexServ or ISDN BRI, ISDN PRI or National. Such a list of specially equipped central offices may be sorted by city, state or local access and transport area (LATA). For example, suppose that A. E. Chris knows that Bowie Enterprises International is interested in certain types of telecommunication services. Based on this information, A. E. Chris knows that to serve the needs of Bowie, a central office will have to provide the following services: SynchroNet; FlexServ; ISDN BRI; IDSN PRI; and ISDN 1 (Nat'l). To see the list of central offices with these services, A. E. Chris first selects all of these services from the menu of services 152 provided by Central Office Lists table 150. Of course, those skilled in the art will understand that A. E. Chris may select no special services, fewer services, or more services (if they were available) and obtain a list of central offices respectively with no services, fewer services, or more services. Based upon the selection of the services, the preferred embodiment consults the Central Office database to find central offices having those selected services. The present invention then sorts the central offices having those selected services according to city, state or LATA as chosen by the user. Referring to our example again, and to FIG. 3K, the selection of services made by A. E. Chris has resulted in the display of information regarding two central offices: Toco Hills 154 and Tocups Cir 156.

From the information provided by the Central Office lists 150, the user selects the nearest appropriate central office for the provision of telecommunication services ultimately to the customer's premises. One way an AE may select an "appropriate" central office of a list of central offices is to select the central office with an NPA/NXX code referenced by the customer or otherwise known to be relatively close to the customer's premises.

In an embodiment, the present invention preferably determines which of the central offices with or without the selected services as shown in the Central Office Lists 150 table is the nearest to the customer's premises. This determination is based on a calculation of the distance between each central office to the customer's premises pursuant to the well known V&H formula using the respective V&H coordinates of each central office and the customer's premises. The determination proceeds by comparing each of the distance determinations to find the shortest distance between a central office with (or without) the selected services and the customer's premises. This embodiment of the present invention then preferably displays this determination to the user in some fashion such as highlighting the appropriate entry corresponding to the nearest central office in the Central Office Lists 150.

After the selection of a central office, to continue the process of determining the distance between the selected central office and the customer's premises, the user again refers Customer to Central Office screen display. See FIG. 3L. The user inputs information that identifies the selected central office into the appropriate field in the Customer to Central Office screen display 100. In an embodiment, the present invention allows the user to identify the selected central office on the Central Office Lists 150, and then the present invention imports the appropriate information to the Customer to Central Office screen display 100. The present invention then preferably calculates the distance between the customer's premises and the selected central office using the respective site' V&H coordinates. After such calculation, the present invention displays the determined distance on the Customer to Central Office screen display 100. In this manner, the user has been provided with an accurate and quick determination of the distance between two objects.

Figure 3L:
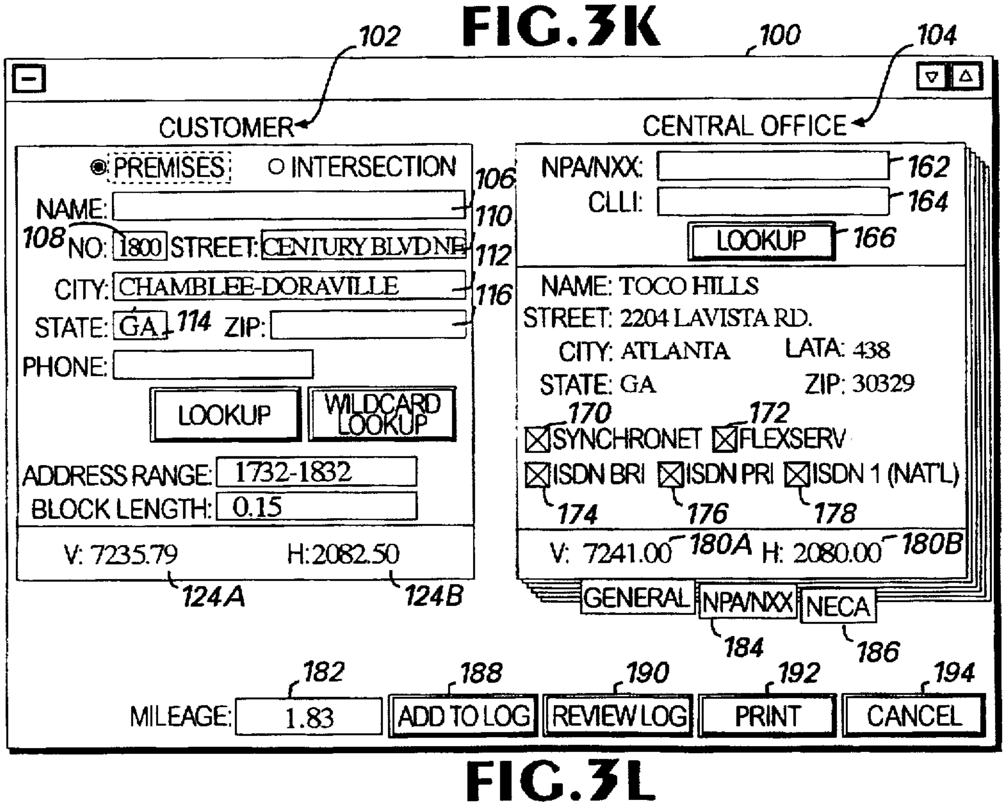

To more particularly explain the preferred process of the present invention, reference is made to FIG. 3L. Our intrepid account executive, A. E. Chris has selected the Toco Hills Central Office as the nearest central office to Bowie International Enterprises. A. E. Chris has input information corresponding to the Toco Hills central office into the NPA/NXX field 162 in the Central Office section 104 of screen display 100. Alternatively, A. E. Chris may have entered information corresponding to the Toco Hills central office into the CLLI field 164. Either the NPA/NXX or the CLLI information is preferably required to continue the distance determination. After entry of the NPA/NXX information, A. E. Chris clicks on the "Lookup" button 166 in the Central Office section 104 of screen display 100. As a result of the Lookup click, the present invention provides information corresponding to the Toco Hills central office in other fields of the Central Office section 104 of screen display 100. This information is derived in a manner well known to those skilled in the art from a consultation of the same Central Office database that was discussed in connection FIG. 3K.

As illustrated in FIG. 3L, in response to the input of either NPA/NXX or CLLI information for the Toco Hills central office, the present invention preferably supplies the following information:

Name: TOCO HILLS
Street: 2204 LaVista Road
City: Atlanta LATA: 438
State: Ga. Zip: 30329

In addition, the present invention provides a display of the services available at the selected central office. In FIG. 3L, check marks indicate that the following services are available at the Toco Hills central office: SynchroNet 170; FlexServ 172; ISDN BRI 174; ISDN PRI 176; and ISDN 1 (Nat'l) 178. By the display of these services, the preferred embodiment allows the user to double-check that the selected central office provides the services necessary to the customer. Further, the present invention displays the V&H coordinates for the selected central office in the V: 180A field and the H:1 80B field of the Central Office section 104 of screen display 100. As illustrated in FIG. 3L, the V&H coordinates for the Toco Hills office are V: 7241.00 and H: 2080.00.

4. Display of the distance determination

As one of the last steps in the determination of distance, the present invention preferably calculates the distance based on the V&H coordinates of the customer's premises as displayed in V&H fields 124A–B and on the V&H coordinates of the selected central office as displayed in the V&H fields 180A–B. This calculation is carried out in a manner well known to those skilled in the art pursuant to the following well known formula:

$$\text{Distance} = \sqrt{\frac{(V_1 - V_2)^2 + (H_1 - H_2)^2}{10}}$$

This formula is referred hereinafter as the V&H formula.

Referring to FIG. 3L, the distance between Bowie Enterprises International and the Toco Hills central office has been determined to be 1.83 miles as displayed in mileage field 182 of screen display 100. Thus, when A. E. Chris consults with Bowie on the LOC pricing of telecommunication services, A. E. Chris may rely on 1.83 miles as an accurate measure of the distance for the provision of telecommunications services to Bowie's premises from the Toco Hills central office. A. E. Chris uses this accurate measure as a factor in the pricing of telecommunication services without fear of overpricing (thereby losing the deal) or underpricing (thereby violating tariffs).

The present invention also preferably includes another feature to assure accuracy in the distance determination and to prevent fraud in the use thereof. Referring again to FIG. 3L, once the distance determination has been displayed in mileage field 182, the present invention does not allow any further changes to the information displayed in the customer information fields. In particular, in the preferred embodiment, once the distance determination has been displayed in mileage field 182, any further movement or action of the cursor by the user in customer information input fields such as no. field 108, street field 110, etc. results in the erasure or blanking out of the distance determination displayed in mileage field 182. In other words, a user cannot return to the customer information and change it without redoing the distance determination process and display of the resulting distance determination. In this way, an AE always provides pricing information based on correct distance determination given the input customer information.

The present invention preferably includes a number of other features that are useful to the user. Referring again to FIG. 3L, the present invention provides an NPA/NXX tab 184 on the Central Office section 104 of screen display 100. In response to a click on this NPA/NXX tab 184, the present invention displays NPA/NXX numbers assigned to the selected central office that are available for assignment to customers. By this feature, the present invention provides the user with information to present to the customer. For example, Bowie Enterprises International may desire a special NPA/NXX number such as "123/123". A. E. Chris is able to check on the availability of that special number, and if it is unavailable, to make suggestions for other numbers.

Still referring to FIG. 3L, the present invention preferably provides another feature to users. In particular, the preferred embodiment provides an NECA tab 186 on the Central Office section 104 of screen display 100. In response to a click on this NECA tab 186, the present invention displays information on telecommunication services available at the selected central office, or other related information.

Another feature of the preferred embodiment of the present invention is that it allows a user to maintain a log of Customer to Central Office calculations, and the information accompanying or necessary to such calculations. Such a log may be useful if an account executive is sizing up a potential customer for a potential sale. The account executive is able to review the distance information pertaining to other customers at selected central offices so as to make an approximation of the pricing of services for the potential customer. Of course, those skilled in the art will understand that there may be many other uses for such a log. Based on the example used above, the reader will understand that our favorite account executive A. E. Chris is very diligent in the performance of his duties, and adds each distance determination for a customer to a log. Referring to FIG. 3L, to add the distance determination for Bowie Enterprises International to the log, A. E. Chris clicks on the Add to Log 188 button of screen display 100. If A. E. Chris had simply wanted to review a log of distance determinations, A. E. Chris could have clicked on the Review Log 190 button. Of course, the preferred embodiment provides for the standard graphic user interface functions such as "print" 192 and "cancel" 194 as indicated on the screen display 100, as well as other standard features which will be well known to those skilled in the art.

5. Customer to central office log

Figure 4:
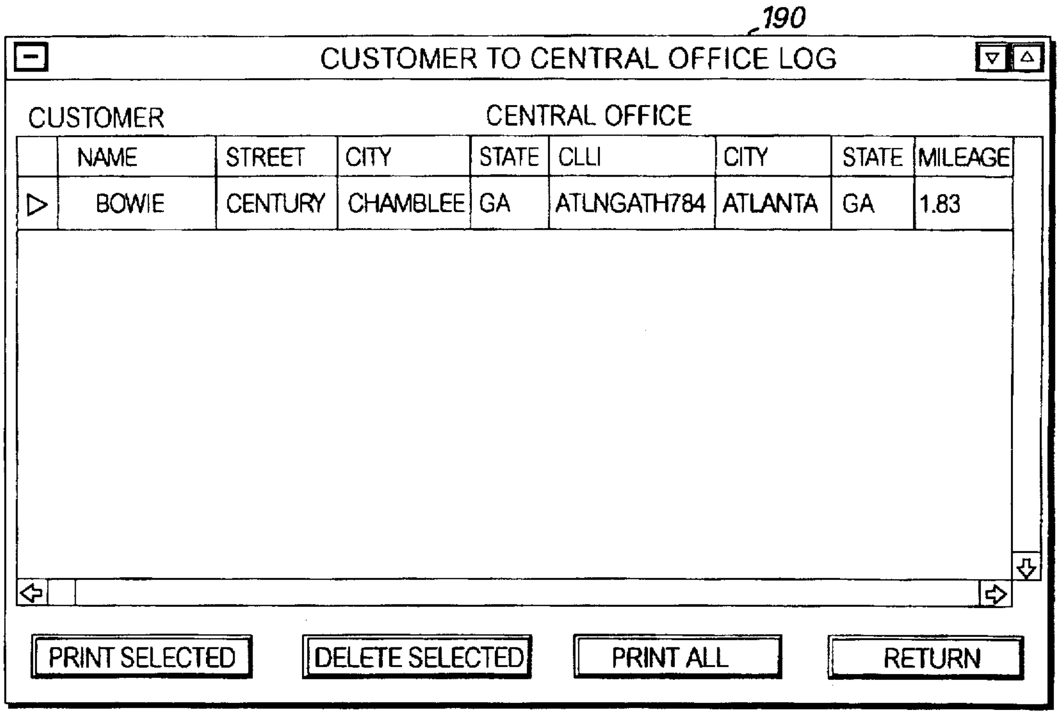
FIG. 4 illustrates a screen display of an exemplary table for a customer to central office log of a computer program of a type which interacts with the preferred embodiment of the present invention.

FIG. 4 illustrates a screen display 190 of an exemplary table for a Customer to Central Office log of a computer program of a type which interacts with the preferred embodiment of the present invention. In particular, the MILEAGE TOOL program provides a display of the Customer to Central Office log as illustrated in screen display 190. The referenced log display 190 includes customer information including name, street, city and state and central office information including CLLI, city, state and mileage. Of course, the referenced log display allows standard graphic user interface functions, which will be well known to those skilled in the art.

IV. Description of the Process Steps of the Preferred Embodiment

Figure 5:
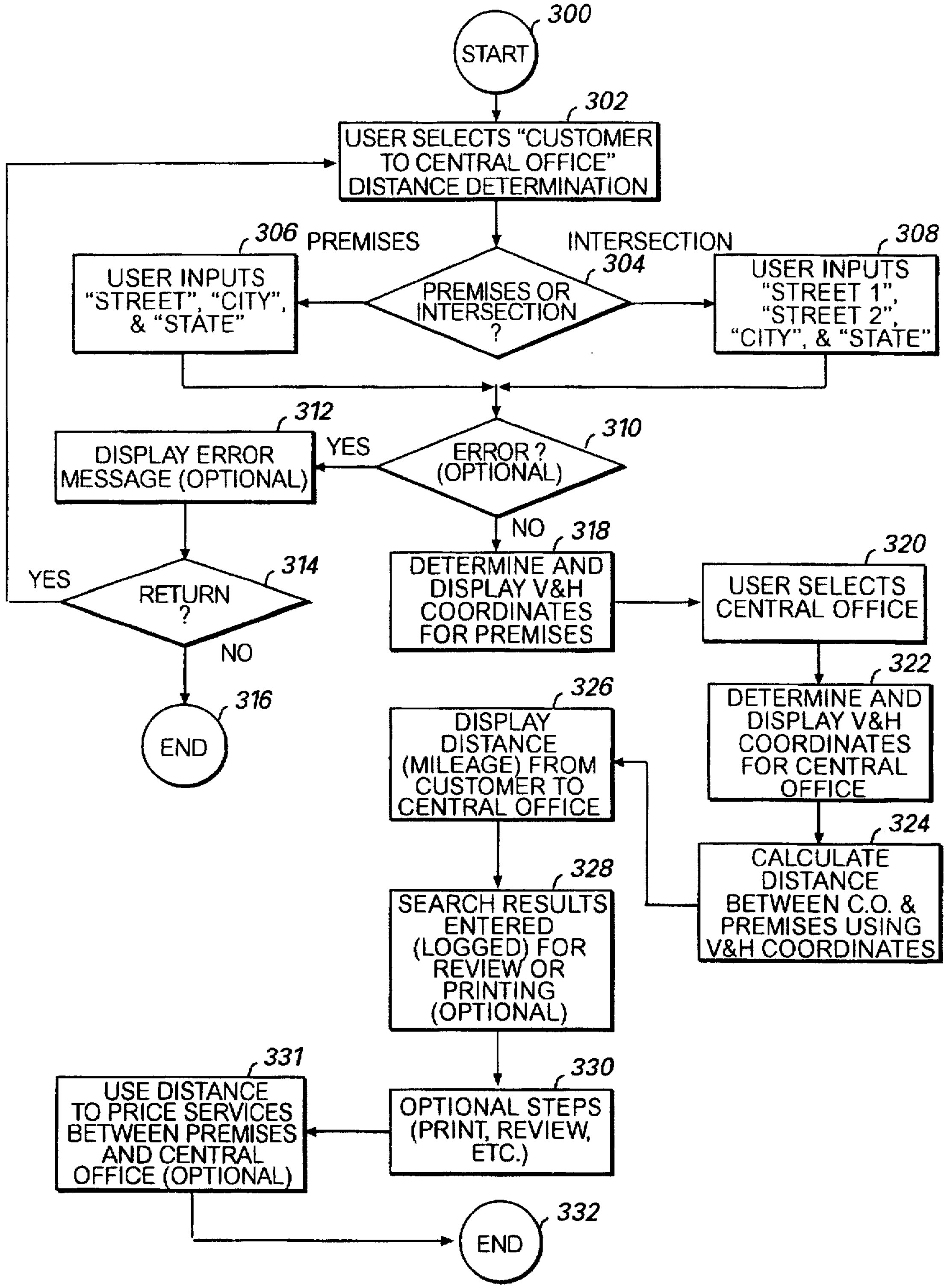
FIG. 5 is a logical flow diagram of the process of the preferred embodiment of the present invention.

FIG. 5 is a logical flow diagram of the process of the preferred embodiment of the present invention. This process has already been generally explained above in the specific context of the preferred use of the MILEAGE TOOL program. However, as will be apparent to those skilled in the art, the process of the present invention may be embodied in other programs and systems as well. Thus, the flow diagram of FIG. 5 provides a summary explanation of the general process steps.

FIG. 5 is entered at start step 300 and proceeds to step 302 wherein a user elects to proceed with a determination of the geographical distance between a first object and a second object. With respect to the MILEAGE TOOL example, the user selects "customer to central office" distance determination. In response to this selection, the user is faced in step 304 with a choice of proceeding based on premises information or on intersection information. If the user chooses premises, then in step 306 the user provides first identification information identifying the first object. With respect to the MILEAGE TOOL example, the user inputs "street", "city" and "state" as first identification information identifying the customer's premises as the first object. On the other hand, if the user chooses intersection, then in step 308 the user provides first identification information identifying the first object. With respect to the MILEAGE TOOL example, the user inputs "street 1", "street 2", "city" & "state" as first identification information identifying a near intersection to the customer's premises.

After either step 306 or step 308, the present invention in optional step 310 checks whether an error has occurred. The term "error" is used generally herein to refer to anything that hinders the continued process of distance determination or that requires the input of additional information. For example, a user may not provide sufficient identification information in either steps 306 and 308. Additional information from the user may be required. For instance, in the MILEAGE TOOL example discussed above, A. E. Chris had to twice provide additional information with respect to the street address of Bowie Enterprises International. Suffice it to say that the preferred embodiment generally requests additional information of the user until the process can proceed no further or until sufficient information to proceed has been obtained.

With respect to the preferred embodiment, the MILEAGE TOOL program allows for at least seven different error messages to be returned to the user in appropriate circumstances when the premises branch of the process described in FIG. 5 is followed. These seven error messages are as follows: Code 0—address not found; Code 1—a perfect match; Code 3—exact address or similar address found in neighboring town; Code 4—found multiple exact matches; Code 5—found close house number; and Code 6—found close house number address in neighboring town. Each of the messages requires the user to take some action to proceed with the distance determination such as, in the case of Code 0—address not found, to input another address. Although Code 1 (a perfect match) does not, at first glance, appear to be an "error" message, it will be appreciated that in the case of a perfect match, the preferred embodiment presents the user with a screen display (See FIG. 3I) announcing the perfect match and requires the user to click the "OK" button to continue the distance determination.

The MILEAGE TOOL program also preferably provides at least four different error messages to be returned to the user in appropriate circumstances when the intersection branch of the process is followed. These four error messages are as follows: Code 0—Can't interpret the input intersection or intersection not found; Code 1—found exact match; Code 2—found some matches; and Code 3—exact matches or similar address found in a neighboring town or found more than one intersection in this area please try another cross street or an address search. As with the other error messages, each of the latter messages requires the user to take some action to proceed with the distance determination.

In addition, it will be apparent to those skilled in the art that error check steps such as error check step 310 may occur in other places in the described process.

If an error has occurred, then in optional step 312 the present invention displays an error message such as discussed above and the present invention proceeds to decision step 314. In decision step 314, the present invention checks whether it should end the process of distance determination or return to a previous step in the process. If the process is to end, the present invention proceeds to end step 316. If the process is to return, the present invention returns to step 302 described above, or any other appropriate entry point for the process.

Referring again to optional step 310 of FIG. 5, if the present invention determines that no error has occurred, then in step 318 the first identification information is used to determine a first set of vertical-horizontal coordinates corresponding to the first object. With respect to the MILEAGE TOOL example, the preferred embodiment invention determines and displays the V&H coordinates for the customer's premises identified as a result of either step 306 or step 308.

After the display of V&H coordinates for the premises in step 318, in step 320 the present invention obtains second identification information identifying the second object. With respect to the MILEAGE TOOL example, the preferred embodiment receives information from the user by the user's selection of a central office. In step 322, the present invention uses the second identification information to determine a second set of vertical-horizontal coordinates corresponding to the second object. In the preferred embodiment, a display is provided of central office information including a display of V&H coordinates for the selected central office. In step 324, the present invention uses the first set of vertical-horizontal coordinates and the second set of vertical-horizontal coordinates to calculate the geographical distance between the first object and the second object. In the preferred embodiment, this step includes the calculation of the distance between the customer's premises and the selected central office based on the respective sets of V&H coordinates.

After the geographical distance has been determined, in step 326 the present invention displays the distance. In the MILEAGE TOOL example, the preferred embodiment displays the mileage between the customer's premises and the selected central office. In the optional step 328, the present invention enters the search results in a log so that the search results including the distance determination may be reviewed at a later time, printed, etc. The present invention may also include other optional steps 330 such as printing of the materials used in the process, review of the materials, etc.

In optional step 331, the preferred embodiment of the present invention uses the distance determination to evaluate, and in particular, to price telecommunication services between the customer's premises and the selected central office. A more general statement of this feature is that a user may use the distance determination to evaluate services between a first object and a second object, and in particular to price services between a first and second object. With respect to the telecommunications industry, a price based on distance determination may be quoted for any of the following types of services as well as others: analog private line services including data lines, voice private lines, OPX/OPS (off premises extensions/off premises service), and tie lines; business lines; trunk circuits; Network Access Registers (NARs); TouchStar; Custom Calling; FlexServ service (digital access cross connect service); MegaLink (digital grade data service); Channelized MegaLink (digital grade data service); ISDN; and SynchroNet.

The preferred embodiment works in a manner well known to those skilled in the art in connection with the application program known as the PRICING TOOL, BellSouth Corporation, Atlanta, Georgia. The PRICING TOOL is a WINDOWS system based application developed for use by telecommunications sales personnel to support sales and proposal activities. The PRICING TOOL is designed and formatted to match the structure of the General Subscriber Service Tariff and the Price Line Tariff. With user input, the PRICING TOOL generates quotes for telecommunication services. The quote are based on the prices and universal service order codes (USOCs) found in the tariffs. The PRICING TOOL provides each quote in an easy to read and understand format and groups quotes together as proposal to a customer. The quotes may be printed in three different formats: customer detail; customer summary; and business office. The PRICING TOOL allows the user to search and to review quotes and proposals by customer name, proposal number, quote number, customer telephone number, and customer ID number. As part of the calculation of a quote, a distance determination from the MILEAGE TOOL program (or any other program or system of the same functionality) may be imported to the PRICING TOOL and used in a manner well known to those skilled in the art. In particular, the PRICING TOOL may use the distance determination in the calculation of price quotes and generation of proposals to a customer.

Referring again to FIG. 5, the process ends in step 332.

V. OTHER FEATURES OF THE PREFERRED EMBODIMENT

A. Central office to central office distance determination

As noted above, there may be two parts to pricing telecommunication services if the customer's nearest central office is not equipped to provide certain additional services.

In that case, the additional services have to be backhauled to the customer's nearest central office for ultimate delivery to the customer's premises. In the backhaul case, the pricing of the telecommunication services has two components: (1) the pricing of the services received from the nearest central office (Local Office Channel (LOC)); and (2) the pricing of the services received from the specially equipped central office (Interoffice Channel (IOC)). Based on the discussion above, an AE may use the preferred embodiment of the present invention to quickly and accurately determine the distance between the customer's premises and the nearest central office, and then to price the LOC component of the telecommunication services. The preferred embodiment also provides the AE with the ability to quickly and accurately determine the distance between the customer's nearest central office and the nearest specially equipped central office. The AE then may use this distance determination to price the IOC component of the telecommunication services.

Figure 6:
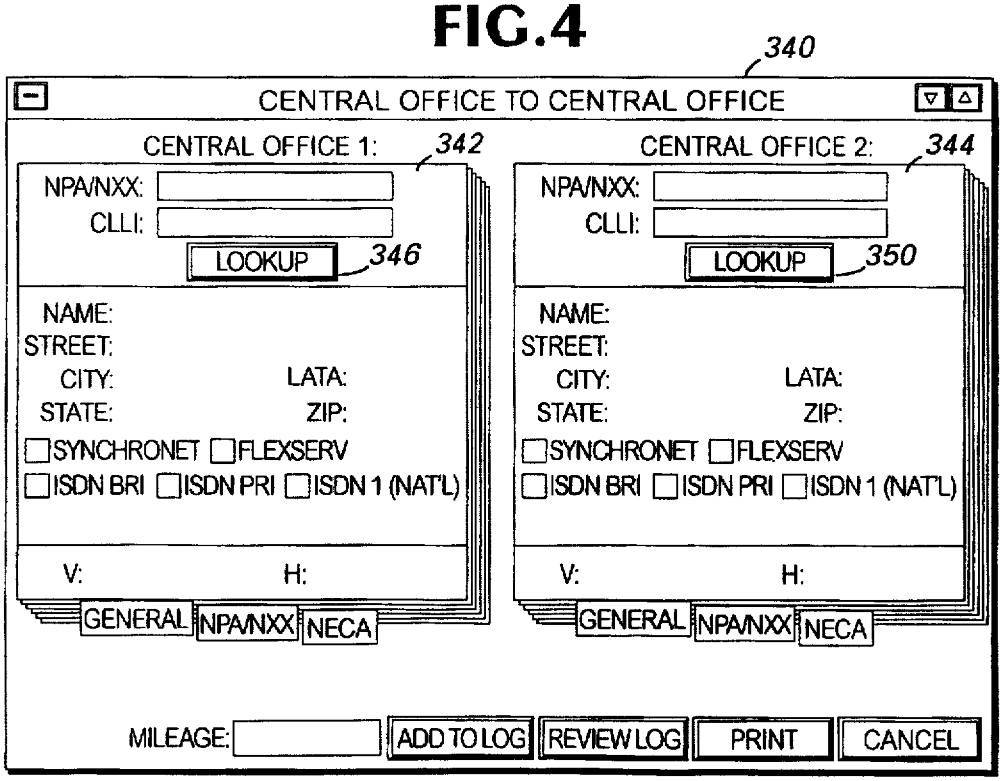
FIG. 6 illustrates a screen display of an exemplary central office to central office template for use with a computer program of a type which interacts with the preferred embodiment of the present invention.

Generally stated, the preferred embodiment of the present invention may be used to obtain other distance information based on the use of V&H coordinates. For example, a user may use the MILEAGE TOOL program to obtain the distance between two different central offices. FIG. 6 illustrates a screen display 340 of an exemplary central office to central office template for use with a computer program of a type which interacts with the preferred embodiment of the present invention. Use of the screen display 340 and its interaction with the preferred embodiment is very similar to the previously described screen display, FIGS. 3A–3L. Thus, only minimal explanation in connection with the central office to central office determination is provided because their use and function be readily understood by those skilled in the art given the previous discussion.

Referring to FIG. 6, to determine the distance between two different central offices, the user provides input information about the first central office in the Central Office 1 section 342 of screen display 340. Information about a central office may be obtained and/or imported from the Central Office Lists 150 illustrated in FIG. 3K and used in connection with the Central Office database also discussed above. The input information about the first central office must include at least an NPA/NXX or a CLLI. The user then clicks the Lookup button 346 in the Central Office 1 section 342. The MILEAGE TOOL program consults with the LOCATE-IT database referenced above and returns information about the first central office. In particular, the V&H coordinates of the first central office are displayed in the appropriate fields. The user then provides input information about the second central office in the Central Office 2 section 344 of screen display 340. As with the first central office, the input information must include at least an NPA/NXX or a CLLI for the second central office. The user then clicks the Lookup button 350 in the Central Office 2 section 344. The MILEAGE TOOL program consults with the LOCATE-IT database and returns information about the second central office. In particular, the V&H coordinates of the second central office are displayed in the appropriate fields. The present invention then uses the well known V&H formula (referenced above) to calculate the geographic distance between the first central office and the second central office, and the distance determination is displayed in the mileage field of screen display 340.

Figure 7:
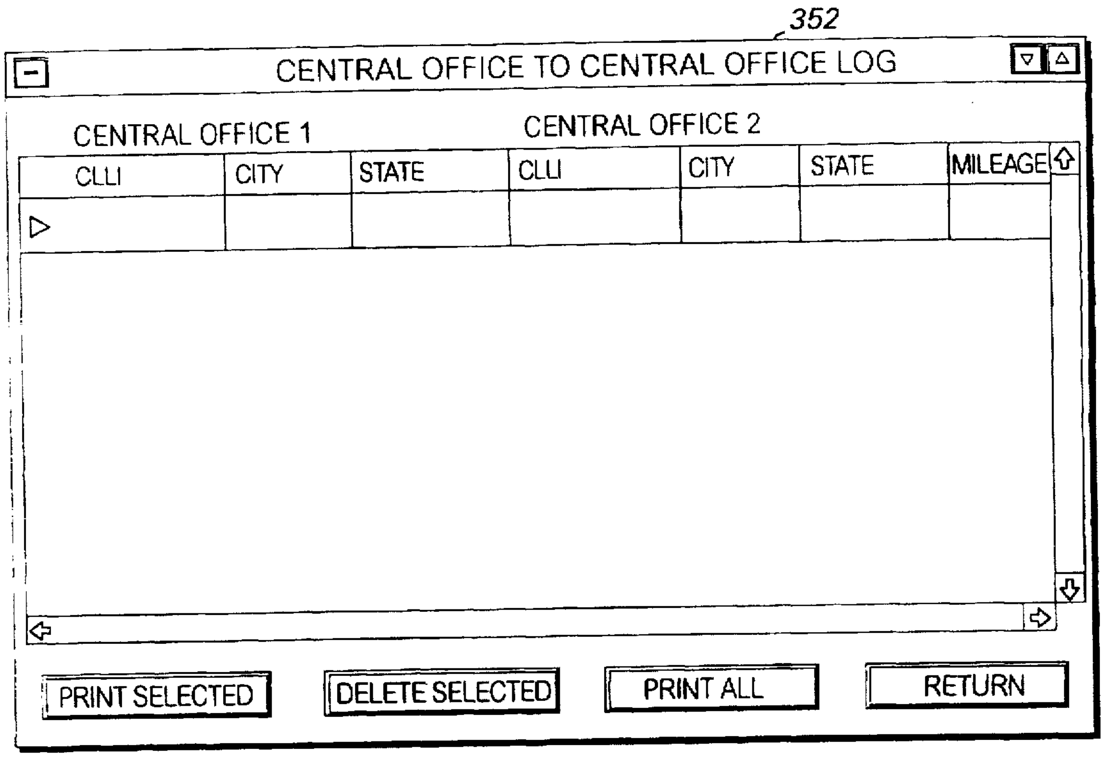
FIG. 7 illustrates a screen display of an exemplary table for a central office to central office log of a computer program of a type which interacts with the preferred embodiment of the present invention.

The feature of the preferred embodiment that allows a user to obtain the distance between two different central offices also provides the user with functions that will not be discussed in detail herein, but which will be readily understood to those skilled in the art. For example, this feature allows a user to display information about each of the two central offices such as name, street, city, state, LATA, and service features such as SynchNet, FlexServ, ISDN BRI, etc. Further, this feature allows the user to create, keep and review a log of information related to the distance determination between two different central offices. An example of the preferred format of a such Central Office to Central Office Log 352 is illustrated in FIG. 7.

B. V&H to V&H calculation

Figure 8:
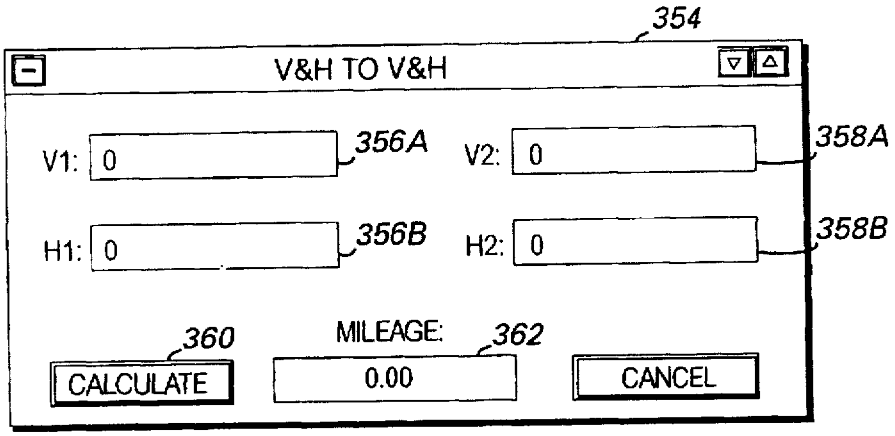
FIG. 8 illustrates a screen display of an exemplary V&H to V&H template for use with a computer program of a type which interacts with the preferred embodiment of the present invention.

Another piece of distance information that the preferred embodiment of the present invention allows a user to obtain is the distance between two objects as represented by their respective V&H coordinates. FIG. 8 illustrates a screen display of an exemplary V&H to V&H template for use with a computer program of a type which interacts with the preferred embodiment of the present invention. Use of the screen display 354 and its interaction with the preferred embodiment is very similar to the previously described screen displays. Thus, only minimal explanation in connection with the V&H to V&H determination is provided because it will be readily understood by those skilled in the art given the previous discussion.

To determine the distance between two objects represented by respective V&H coordinates, the user provides input information about the first object by inputting the first object's V&H coordinates in the appropriate fields 356 of screen display 354. The user then provides input information about the second object by inputting the second object's V&H coordinates in the appropriate fields 358 of the screen display 354. The user then clicks the calculate button 360. The MILEAGE TOOL then calculates the distance between the objects by using the well known V&H formula (referenced above). The distance determination then is displayed in the mileage field 362.

Those skilled in the art will understand that the various steps of the present invention include other error branches that cause the method or process to abort if an error condition such as a lack of free memory exists in the computer system 12. Such error branches are well known in the art and are not directly related to the present invention. Accordingly, they will not be further described.

From the foregoing description of the preferred embodiment and the several alternatives, other alternative constructions of the present invention may suggest themselves to those skilled in the art. Therefore, the scope of the present invention is to be limited only to the claims below and the equivalents thereof.

What is claimed is:

1. In a telecommunications services system, a computer system for determining the geographical distance between a first object and a nearest second object of a plurality of second objects based on the use of a telecommunications services vertical-horizontal coordinate system, comprising:

a vertical-horizontal coordinate database, said vertical-horizontal coordinate database including a plurality of sets of vertical-horizontal coordinates;

a central processing unit operative to communicate with said vertical-horizontal coordinate database;

a display device coupled to said central processing unit;

an input device coupled to said central processing unit, said input device being operative to receive first identification information corresponding to said first object; and said central processing unit being operative to read said first identification information, and in response thereto, to obtain a first set of vertical-horizontal coordinates corresponding to said first identification information from said vertical-horizontal coordinate database;

based on said first set of vertical-horizontal coordinates, to identify the nearest second object from said plurality of second objects, the nearest second object being closest of said plurality of second objects to said first object; and to cause said display device to display said first object, said nearest second object, and the geographical distance between said first object and said nearest second object.

2. The computer system of claim 1, wherein said central processing unit is further operative to use said geographical distance between said first object and said nearest second object to price services provided between said first object and said nearest second object.

3. The computer system of claim 1, wherein said vertical-horizontal coordinate database includes a first plurality of sets of vertical-horizontal coordinates;

further comprising a second object database, said second object database including a second plurality of sets of vertical-horizontal coordinates, each of said second plurality of sets of vertical-horizontal coordinates corresponding to one of said plurality of second objects; and wherein said central processing unit is operative to communicate with said second object database, to identify said nearest second object from said plurality of second objects by comparing said first set of vertical-horizontal coordinates of said first object to at least one of said each of said second plurality of sets of vertical-horizontal coordinates corresponding to said plurality of second objects so as to identify said nearest second object that is closest to said first object.

4. The computer system of claim 1, wherein said central processing unit is further operative to read a change in said first identification information based on a substitution of a changed first object for said first object, in response thereto to cause said display device to erase said geographical distance;

based on said change in said first identification information, to obtain a changed first set of vertical-horizontal coordinates;

based on said changed first set of vertical-horizontal coordinates to identify the changed nearest second object from said plurality of second objects, the changed nearest second object being closest of said plurality of second objects to said changed first object; and to cause said display device to display said changed first object, said changed nearest second object, and the geographical distance between said changed first object and said changed nearest second object.

5. A computer-readable medium on which is stored a computer program for determining the geographical distance between a first object and a nearest second object of a plurality of second objects based on the use of a vertical-horizontal coordinate system, said computer program comprising instructions which, when executed by a computer, perform the steps of:

reading first identification information identifying said first object;

using said first identification information to determine a first set of vertical-horizontal coordinates corresponding to said first object by consulting a vertical-horizontal coordinate database;

using said first set of vertical-horizontal coordinates to identify said nearest second object from said plurality of second objects said nearest second object being closest of said plurality of second objects to said first object; and displaying said first object, said nearest second object, and the geographical distance between said first object and said nearest second object.

6. The computer-readable medium on which is stored said computer program of claim 5, said computer program further comprising instructions which, when executed by said computer, further perform the step of using said geographical distance between said first object and said nearest second object to price services provided between said first object and said nearest second object.

7. The computer-readable medium on which is stored said computer program of claim 5, said computer program comprising instructions which, when executed by said computer, includes the step of using said first identification information, wherein said step of using said first identification information comprises using said first identification information to determine said nearest second object by consulting a second object database.

8. The computer-readable medium on which is stored said computer program of claim 5, said computer program comprising instructions which, when executed by said computer, further perform the steps of:

noting any change to said first identification information identifying said first object based on a substitution of a changed first object for said first object;

in response to said step of noting said change, erasing said geographical distance;

using said change in said first identification information to obtain a changed first set of vertical-horizontal coordinates;

using said changed first set of vertical-horizontal coordinates to identify the changed nearest second object from said plurality of second objects, the changed nearest second object being closest of said plurality of said second objects to said changed first object; and causing said display device to display said changed first object, said changed nearest second object, and the geographical distance between said changed first object and said changed nearest second object.

9. IN a telecommunications system, a method for determining the geographical distance between a first object and a nearest second object of a plurality of second objects based on the use of a vertical-horizontal coordinate system, comprising the steps of:

obtaining first identification information identifying said first object;

using said first identification information to determine a first set of vertical-horizontal coordinates corresponding to said first object;

using said first set of vertical-horizontal coordinates to identify said nearest second object from said plurality of second objects, said nearest second object being closest of said plurality of second objects to said first object; and displaying said first object, said nearest second object, and the geographical distance between said first object and said nearest second object.

10. The method of claim 9, further comprising the step of using said geographical distance between said first object and said nearest second object to price services provided between said first object and said nearest second object.

11. The method of claim 9, wherein said step of using said first set of vertical-horizontal coordinates comprises using said first set of vertical-horizontal coordinates to determine said nearest second object by consulting a second object database.

12. The method of claim 9, further comprising the steps of:

noting any change to said first identification information identifying said first object based on a substitution of a changed first object for said first object;

in response to said step of noting said change, erasing said geographical distance;

using said change in said first identification information to obtain a changed first set of vertical-horizontal coordinates;

using said changed first set of vertical-horizontal coordinates to identify the changed nearest second object from said plurality of second objects, the changed nearest second object being closest of said plurality of said second objects to said changed first object; and causing said display device to display said changed first object, said changed nearest second object, and the geographical distance between said changed first object and said changed nearest second object.

13. The computer system of claim 1, wherein each second object of said plurality of second objects comprises a feature; and wherein said central processing unit is operative to identify said nearest second object from said plurality of second objects comprising said feature so that said nearest second object comprises said feature.

14. The computer system of claim 1, wherein one or more of said plurality of second objects includes a feature;

wherein said input device is further operative to receive a feature selection corresponding to said feature of said one or more of said plurality of second objects; and wherein said central processing unit is further operative to read said feature selection, and based on said first set of vertical-horizontal coordinates and said feature selection, to identify said nearest second object from said one or more of said plurality of second objects including said feature.

15. The computer system of claim 1, wherein one or more of said plurality of second objects includes a feature;

wherein said input device is further operative to receive a feature selection corresponding to said feature of said one or more of said plurality of second objects; and wherein said central processing unit is further operative to read said feature selection, based on said first set of vertical-horizontal coordinates and said feature selection, to identify at least two nearest second objects from said one or more of said plurality of second objects including said feature, said at least two nearest second objects being the two closest of said one or more of said plurality of second objects to said first object, to cause said display device to display said first object, said two nearest second objects, and the geographical distances, respectively, between said first object and said two nearest second objects.

16. The computer-readable medium on which is stored said computer program of claim 5, wherein one or more of said plurality of second objects includes a feature, said computer program further comprising instructions, which when executed by said computer, further comprise the step of:

reading a feature selection corresponding to said feature of said one or more of said plurality of second objects; and wherein said step of using said first set of vertical-horizontal coordinates to identify said nearest second object from said plurality of second objects comprises using said first set of vertical-horizontal coordinates and said feature selection to identify said nearest second object from said one or more of said plurality of second objects including said feature.

17. The method of claim 9, wherein one or more of said plurality of second objects, further comprising the step of:

reading a feature selection corresponding to said feature of said one or more of said plurality of second objects; and wherein said step of using said first set of vertical-horizontal coordinates to identify said nearest second object from said plurality of second objects comprises using said first set of vertical-horizontal coordinates and said feature selection to identify said nearest second object from said one or more of said plurality of second objects including said feature.

* * * * *